United States Patent
Kitoh et al.

(10) Patent No.: US 10,290,847 B2
(45) Date of Patent: May 14, 2019

(54) SEPARATOR STRUCTURE BODY FOR USE IN ZINC SECONDARY BATTERY

(71) Applicant: NGK INSULATORS, LTD., Nagoya-Shi (JP)

(72) Inventors: Kenshin Kitoh, Nagoya (JP); Naohito Yamada, Nagoya (JP); Hiroshi Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 136 days.

(21) Appl. No.: 15/358,650

(22) Filed: Nov. 22, 2016

(65) Prior Publication Data

US 2017/0077476 A1     Mar. 16, 2017

Related U.S. Application Data

(63) Continuation of application No. PCT/JP2015/078823, filed on Oct. 9, 2015.

(30) Foreign Application Priority Data

Nov. 13, 2014  (JP) .................................. 2014-231086
Mar. 19, 2015  (JP) .................................. 2015-056315

(51) Int. Cl.
  *H01M 2/16*     (2006.01)
  *H01M 10/28*    (2006.01)
  (Continued)

(52) U.S. Cl.
  CPC ........... *H01M 2/1646* (2013.01); *H01M 2/16* (2013.01); *H01M 2/166* (2013.01); *H01M 2/1686* (2013.01); *H01M 10/28* (2013.01); *H01M 12/08* (2013.01); *H01M 10/30* (2013.01); *Y02E 60/128* (2013.01)

(58) Field of Classification Search
  CPC .. H01M 2/1646; H01M 2/1686; H01M 2/166; H01M 12/08; H01M 2/16; H01M 10/28; H01M 10/30; Y02E 60/128
  See application file for complete search history.

(56) References Cited

U.S. PATENT DOCUMENTS

| | | | |
|---|---|---|---|
| 6,458,483 B1 * | 10/2002 | Hamano | H01M 2/0275 429/127 |
| 2008/0102358 A1 * | 5/2008 | Kowalczyk | H01M 2/0277 429/127 |

(Continued)

FOREIGN PATENT DOCUMENTS

| | | |
|---|---|---|
| EP | 2 843 753 A1 | 3/2015 |
| JP | 2007-227032 A1 | 9/2007 |

(Continued)

OTHER PUBLICATIONS

Extended European Search Report (Application No. 15858735.2) dated Nov. 3, 2017.

(Continued)

*Primary Examiner* — Cynthia K Walls
(74) *Attorney, Agent, or Firm* — Burr & Brown, PLLC

(57) ABSTRACT

Provided is a separator structure for use in a zinc secondary battery. The separator structure includes a ceramic separator composed of an inorganic solid electrolyte and having hydroxide ion conductivity and water impermeability, and a peripheral member disposed along the periphery of the ceramic separator and composed of at least one of a resin frame and a resin film. The separator structure exhibits water impermeability as a whole. The separator structure of the present invention can reliably separate the positive electrode side from the negative electrode side in a zinc secondary battery, is readily sealed and bonded to a resin battery container, and exhibits significantly improved handleability during the assembly of the battery.

14 Claims, 16 Drawing Sheets

(51) Int. Cl.
*H01M 12/08* (2006.01)
*H01M 10/30* (2006.01)

(56) References Cited

U.S. PATENT DOCUMENTS

| | | |
|---|---|---|
| 2014/0227616 A1 | 8/2014 | Yamada et al. |
| 2014/0315099 A1 | 10/2014 | Yamada et al. |
| 2016/0141582 A1 | 5/2016 | Fujisaki et al. |

FOREIGN PATENT DOCUMENTS

| | | |
|---|---|---|
| JP | 2011-210413 A1 | 10/2011 |
| JP | 2012-234720 A1 | 11/2012 |
| JP | 2013-097968 A1 | 5/2013 |
| JP | 2014-049279 A1 | 3/2014 |
| JP | 2014-049412 A1 | 3/2014 |
| JP | 2014-110148 A1 | 6/2014 |
| JP | 5824186 B1 | 11/2015 |
| WO | 2013/073292 A1 | 5/2013 |
| WO | 2013/118561 A1 | 8/2013 |
| WO | 2013/161516 A1 | 10/2013 |

OTHER PUBLICATIONS

International Search Report and Written Opinion (Application No. PCT/JP2015/078823) dated Dec. 22, 2015 (with English translation).

English translation of Written Opinion (Application No. PCT/JP2015/078823) dated Apr. 5, 2017.

\* cited by examiner

SEPARATOR STRUCTURE BODY FOR USE IN ZINC SECONDARY BATTERY

CROSS-REFERENCE TO RELATED APPLICATIONS

This application is a continuation application of PCT/JP2015/078823 filed Oct. 9, 2015, which claims priority to Japanese Patent Application No. 2014-231086 filed Nov. 13, 2014 and Japanese Patent Application No. 2015-056315 filed Mar. 19, 2015, the entire contents all of which are incorporated herein by reference.

BACKGROUND OF THE INVENTION

1. Field of the Invention

The present invention relates to a separator structure for use in a zinc secondary battery.

2. Description of the Related Art

Zinc secondary batteries, such as nickel-zinc secondary batteries and zinc-air secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit caused by dendritic zinc in zinc secondary batteries, such as nickel-zinc secondary batteries and zinc-air secondary batteries.

In order to meet such a demand, batteries including hydroxide-ion-conductive ceramic separators have been proposed. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the general formula: $M^{2+}_{1-x}M^{3+}_{x}(OH)_2A^{n-}_{x/n} \cdot mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4). Patent Document 2 (WO2013/073292) discloses a zinc-air secondary battery including a separator composed of a layered double hydroxide (LDH) having the same basic composition as that in Patent Document 1 and disposed on one surface of the air electrode for preventing a short circuit caused by dendritic zinc between the positive and negative electrodes during a charge mode of the battery and also preventing the intrusion of carbon dioxide into the electrolytic solution.

CITATION LIST

Patent Documents

Patent Document 1: WO2013/118561
Patent Document 2: WO2013/073292

SUMMARY OF THE INVENTION

The applicant has already successfully developed a highly-densified ceramic separator (inorganic solid electrolyte separator) exhibiting hydroxide ion conductivity and yet water impermeability and gas impermeability. The present applicant has also successfully formed such a ceramic separator on a porous substrate (e.g., an alumina porous substrate). The use of such a separator (or a separator provided with a porous substrate) in a secondary battery, such as a zinc-nickel battery or a zinc-air secondary battery, can prevent the short circuit caused by dendritic zinc or the intrusion of carbon dioxide (which may cause problems especially in a metal-air secondary battery). The maximization of such an effect requires reliable separation of the positive electrode side from the negative electrode side by a hydroxide-ion-conductive ceramic separator in a battery container.

The present inventors have found that a separator structure including a hydroxide-ion-conductive ceramic separator and a peripheral member disposed along the periphery of the separator and composed of at least one of a resin frame and a resin film can reliably separate the positive electrode side from the negative electrode side in a zinc secondary battery, and the separator structure is readily sealed and bonded to a resin battery container and exhibits significantly improved handleability during the assembly of the battery.

An object of the present invention is to provide a separator structure that can reliably separate the positive electrode side from the negative electrode side in a zinc secondary battery, that is readily sealed and bonded to a resin battery container, and that exhibits significantly improved handleability during the assembly of the battery.

An aspect of the present invention provides a separator structure for use in a zinc secondary battery, the separator structure comprising:

a ceramic separator comprising an inorganic solid electrolyte and having hydroxide ion conductivity and water impermeability; and a peripheral member disposed along the periphery of the ceramic separator and comprising at least one of a resin frame and a resin film, wherein the separator structure exhibits water impermeability as a whole.

DETAILED DESCRIPTION OF THE INVENTION

Separator Structure

Figure 1:
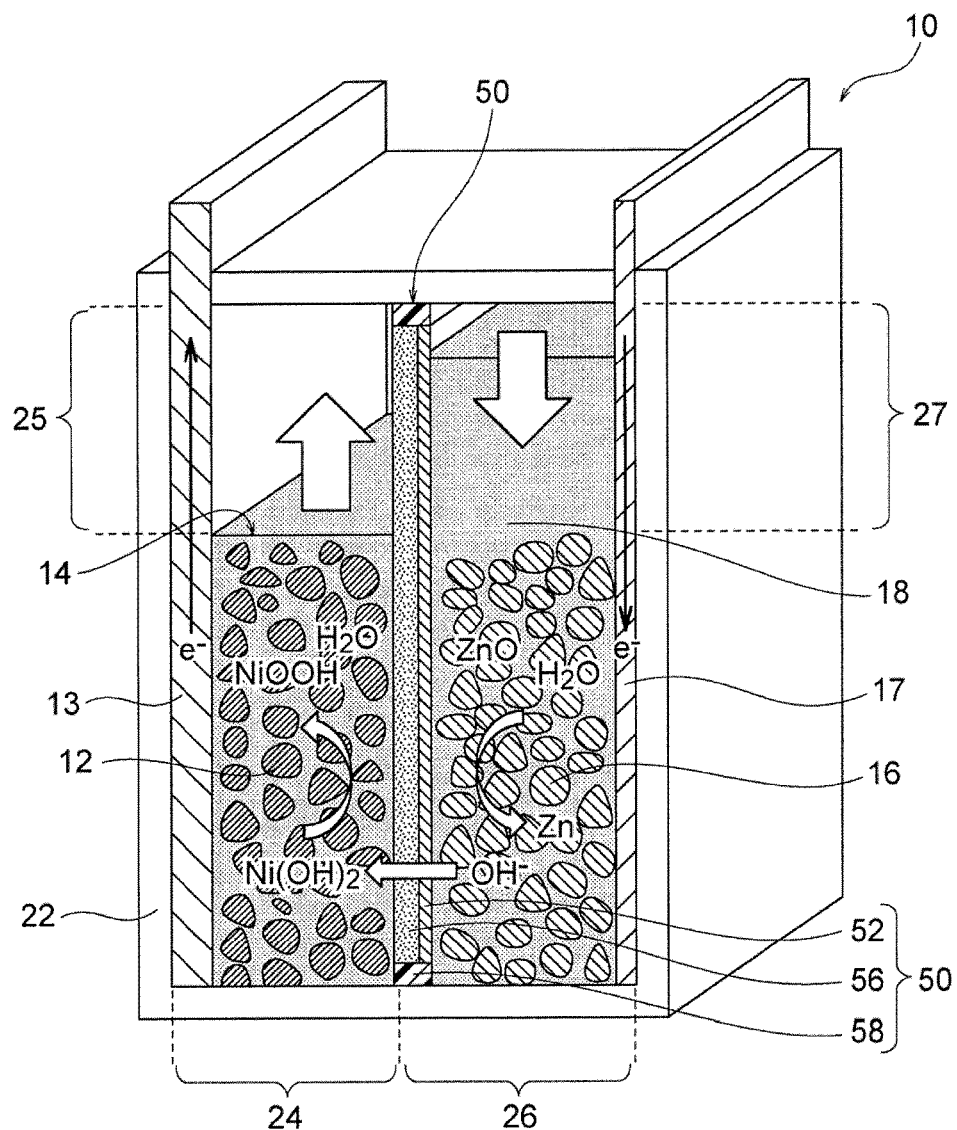
FIG. 1 is a schematic illustration of an exemplary nickel-zinc secondary battery including a separator structure of the present invention, the battery being in a discharge end state.

The separator structure of the present invention comprises a ceramic separator for a zinc secondary battery. The zinc secondary battery referred to herein may be of any type to which a hydroxide-ion-conductive ceramic separator can be applied; for example, any alkaline zinc secondary battery, such as a nickel-zinc secondary battery, a silver oxide-zinc secondary battery, a manganese oxide-zinc secondary battery, or a zinc-air secondary battery. Particularly preferred are a nickel-zinc secondary battery and a zinc-air secondary battery. Although the present invention will be described in detail below with reference to a nickel-zinc secondary battery (FIG. 1) and a zinc-air secondary battery (FIGS. 3A and 3B), the separator structure of the present invention may be applied not only to the nickel-zinc secondary battery and the zinc-air secondary battery, but also to the aforementioned secondary battery to which the hydroxide-ion-conductive ceramic separator can be applied. The separator structure may be applied to a unit cell including one pair of positive and negative electrodes, or may be applied to a stacked battery including two or more pairs of positive and negative electrodes; i.e., two or more unit cells. The stacked battery may be a serially or parallelly stacked battery.

In the case of incorporation of the separator structure of the present invention, the resultant zinc secondary battery includes a positive electrode, a negative electrode, an alkaline electrolytic solution, the separator structure, and a container (preferably composed of a resin). The positive electrode may be appropriately selected depending on the type of the secondary battery. The positive electrode may be an air electrode. The negative electrode may also be appropriately selected depending on the type of the secondary battery. In the case of a zinc secondary battery, the negative electrode may contain zinc, a zinc alloy, and/or a zinc compound. The separator structure comprises a hydroxide-ion-conductive ceramic separator. The separator structure separates the positive electrode from the negative electrode and has water impermeability (preferably both water impermeability and gas impermeability). The container, which is preferably a resin container, accommodates at least the negative electrode and the alkaline electrolytic solution. In a nickel-zinc secondary battery 10 illustrated in FIG. 1, a container 22 accommodates a positive electrode 12 and a positive-electrode electrolytic solution 14. In a zinc-air secondary battery 30 illustrated in FIG. 3A including an air electrode 32 serving as a positive electrode, the air electrode 32 (positive electrode) is not necessarily accommodated in a container 46 completely and may be disposed (e.g., in the form of a lid) to cover an opening 46a of the container 46. The positive electrode is not necessarily separated from the alkaline electrolytic solution, and the positive electrode and the alkaline electrolyte may be combined together to form a positive-electrode mixture. The positive electrode in the form of an air electrode does not require an electrolytic solution in the positive electrode side. The negative electrode is not necessarily separated from the alkaline electrolytic solution, and the negative electrode and the alkaline electrolytic solution may be combined together to form a negative-electrode mixture. A positive-electrode collector may optionally be disposed in contact with the positive electrode, and a negative-electrode collector may optionally be disposed in contact with the negative electrode.

As illustrated in FIGS. 1 to 3B, a separator structure 50 includes a ceramic separator 52 and a peripheral member 58 disposed along the periphery of the ceramic separator 52. The ceramic separator 52 is composed of an inorganic solid electrolyte and has hydroxide ion conductivity and water impermeability (preferably both water impermeability and gas impermeability). The ceramic separator 52 is preferably composed of an inorganic solid electrolyte having hydroxide ion conductivity and being in the form of a membrane or layer densified enough to have water impermeability (preferably both water impermeability and gas impermeability). The separator structure 50 is disposed to separate the positive electrode from the negative electrode. For example, as in the nickel-zinc secondary battery 10 illustrated in FIG. 1, the separator structure 50 may be disposed in the container 22 to separate the positive-electrode chamber 24 accommodating the positive electrode 12 and the positive-electrode electrolytic solution 14 from the negative-electrode chamber 26 accommodating the negative electrode 16 and the negative-electrode electrolytic solution 18. Alternatively, as in the zinc-air secondary battery 30 illustrated in FIG. 3A, the separator structure 50 may be disposed to cover the opening 46a of the container 46 such that the separator structure 50 is in contact with the electrolytic solution 36 and defines a negative-electrode hermetic space with the container 46. The separator structure 50 preferably has hydroxide ion conductivity and water impermeability (preferably water impermeability and gas impermeability). The expression "separator has water impermeability and gas impermeability" refers to that the ceramic separator 52 constituting a main portion of the separator structure 50 has a density sufficiently high to prevent the permeation of water and gas and is not a porous film or porous material having water or gas permeability. Thus, the aforementioned configuration of the zinc secondary battery is very effective for physically inhibiting the penetration of dendritic zinc (which may be formed during a charge mode of the battery) through the ceramic separator, to prevent the short circuit between the positive and negative electrodes. Meanwhile, the aforementioned configuration of the metal-air secondary battery is very effective for inhibiting the intrusion of carbon dioxide contained in air, to prevent precipitation of an alkaline carbonate (caused by carbon dioxide) in the electrolytic solution. In any case, the hydroxide ion conductivity of the ceramic separator leads to efficient migration of hydroxide ions between the positive electrode side (e.g., alkaline electrolytic solution or air electrode) and the negative electrode side (e.g., alkaline electrolytic solution), resulting in charge/discharge reaction between the positive and negative electrodes.

As described above, the separator structure 50 includes the ceramic separator 52 and the peripheral member 58 disposed along the periphery of the ceramic separator 52. The ceramic separator 52 is composed of an inorganic solid electrolyte and has hydroxide ion conductivity and water impermeability. The peripheral member 58 is composed of at least one of a resin frame and a resin film. The separator structure 50 exhibits water impermeability as a whole. Thus, the separator structure, which includes the hydroxide-ion-conductive ceramic separator 52 and the peripheral member 58 (composed of at least one of the resin frame and the resin film) disposed along the periphery of the ceramic separator 52, can reliably separate the positive electrode side from the negative electrode side in the zinc secondary battery. The separator structure can be readily sealed and bonded to the resin battery container, and can exhibit significantly improved handleability during the assembly of the battery. The peripheral member 58 is preferably bonded to the ceramic separator 52 with, for example, an adhesive such that the separator structure 50 exhibits water impermeability as a whole. Thus, the joint between the peripheral member 58 and the ceramic separator 52 is preferably liquid-tightly (more preferably liquid- and gas-tightly) sealed with an adhesive.

Figure 4A:
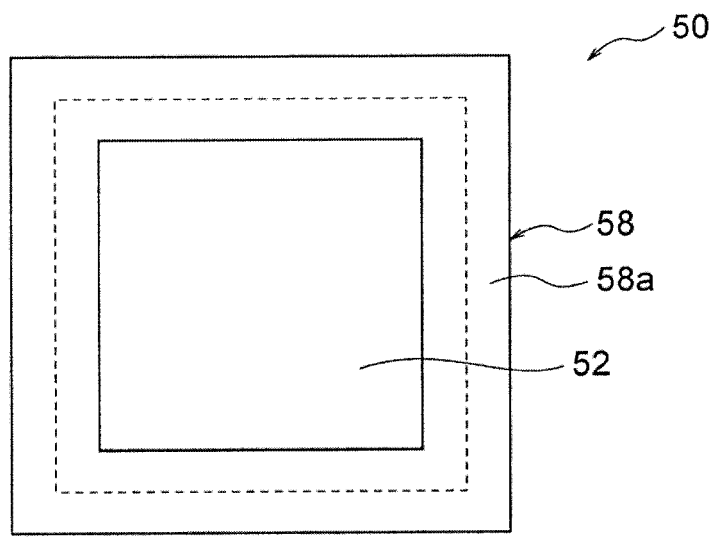
FIG. 4A is a schematic top view of a separator structure according to an embodiment of the present invention.
Figure 4B:
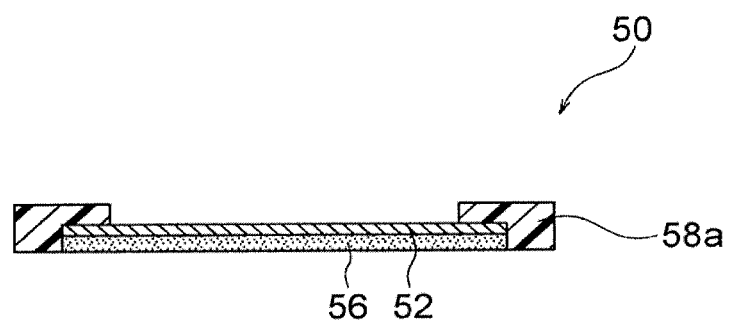
FIG. 4B is a schematic cross-sectional view of the separator structure of FIG. 4A.
Figure 5A:
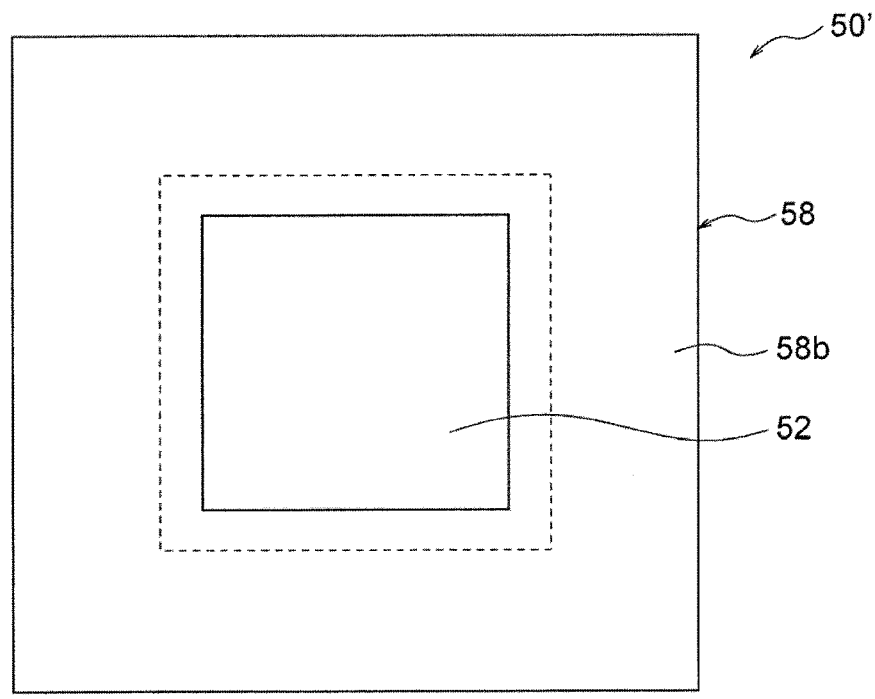
FIG. 5A is a schematic top view of a separator structure according to another embodiment of the present invention.
Figure 5B:
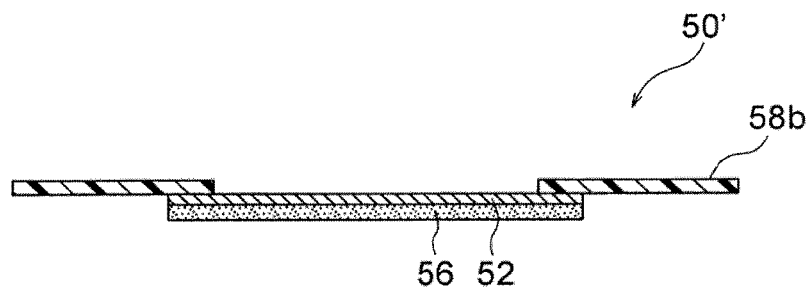
FIG. 5B is a schematic cross-sectional view of the separator structure of FIG. 5A.

In a preferred embodiment of the present invention, the peripheral member 58 may be composed of a resin frame 58a, and the ceramic separator 52 may be fitted or bonded inside the frame 58a and/or on the frame 58a as in the separator structure 50 illustrated in FIGS. 4A and 4B. In another preferred embodiment of the present invention, the peripheral member 58 may be composed of a resin film 58b having an opening, and the ceramic separator 52 may be fitted or bonded to the opening of the resin film 58b as in the separator structure 50' illustrated in FIGS. 5A and 5B. In still another preferred embodiment of the present invention, the peripheral member 58 may be composed of a combination of the resin frame 58a and the resin film 58b having an opening, and the ceramic separator 52 may be fitted or bonded inside the frame 58a and/or on the frame 58a and the frame 58a may be fitted or bonded to the opening of the resin film 58b as in the separator structure 50'' illustrated in FIGS. 6A and 6B.

As described above, the peripheral member 58 may comprise the frame 58a. The frame 58a may be provided with an inner crosspiece, and a plurality of ceramic separators 52 may be respectively fitted or bonded to a plurality of openings defined by the frame 58a and the crosspiece. The frame 58a and the crosspiece (if present) are preferably composed of a dense material (typically a nonporous material) having water impermeability (preferably both water impermeability and gas impermeability). Thus, the separator structure 50 can exhibit water impermeability (preferably both water impermeability and gas permeability) as a whole. Preferably, the joint between the ceramic separator 52 and the frame 58a and the crosspiece (if present) is liquid-tightly sealed with, for example, an adhesive. The adhesive is preferably an epoxy resin adhesive in view of particularly high alkali resistance. A hot-melt adhesive may also be used. The dense material for forming the frame 58a and the crosspiece (if present) is preferably a resin. The resin preferably exhibits alkali resistance to an electrolytic solution containing an alkali metal hydroxide, such as potassium hydroxide. In view of this, the frame 58a and the crosspiece (if present) are preferably composed of at least one selected from the group consisting of polyolefin resins, ABS resins, polypropylene resins, polyethylene resins, and modified polyphenylene ethers, and more preferably composed of an ABS resin, a modified polyphenylene ether, or a combination thereof. In such a case, the frame 58a and the crosspiece (if present) may be composed of the same resin as that of the battery container. If the battery container is composed of a resin and the frame 58a is composed of the same or a different resin (preferably composed of the same resin), the frame 58a is readily bonded to the battery container with an adhesive or by thermal fusion (e.g., laser welding). In such a case, the adhesive is preferably an epoxy resin adhesive in view of particularly high alkali resistance. A hot-melt adhesive may also be used. The thermal fusion may be performed through any known technique, such as laser welding, thermocompression bonding, hot plate welding, ultrasonic welding, high-frequency welding, or thermal welding (e.g., welding by pressing in a heated mold or die (e.g., metal mold or die, or welding by heating with a soldering iron).

As described above, the peripheral member 58 may comprise the resin film 58b. If the battery container is in the form of a flexible pouch composed of a flexible film (e.g., a resin film), the peripheral member 58 comprising the resin film 58b is readily sealed and bonded to the flexible film forming the flexible pouch. Also, a stacked cell pack is readily prepared by alternate disposition of positive and negative electrodes between a plurality of separator structures bonded in the flexible pouch. Preferably, the resin film 58b exhibits resistance to an alkaline electrolytic solution, such as an aqueous potassium hydroxide solution, and a plurality of the resin films 58b can be bonded together or the resin film 58b can be bonded to the resin battery container (which may be a flexible pouch composed of a resin film) or the ceramic separator 52 by thermal fusion or with an adhesive. The resin film 58b may be, for example, a polypropylene (PP), polyethylene (PE), poly(ethylene terephthalate) (PET), poly(vinyl chloride) (PVC), or modified polyphenylene ether film. Thus, the resin film 58b preferably comprises at least one selected from the group consisting of polypropylene resins, polyethylene resins, poly(ethylene terephthalate) resins, poly(vinyl chloride) resins, and modified polyphenylene ethers. The resin film may be a commercially available laminate film. The laminate film is preferably a thermal laminate film composed of two or more layers including a base film (e.g., a PET or PP film) and a thermoplastic resin layer. The resin film (e.g., laminate film) has a thickness of preferably 20 to 500 μm, more preferably 30 to 300 μm, still more preferably 50 to 150 μm. A commercially heat sealer may be used for bonding or sealing (by thermal fusion) between resin films 58b or between the resin film 58b and the resin frame 58a (in particular, the resin film for forming the flexible pouch).

Figure 6A:
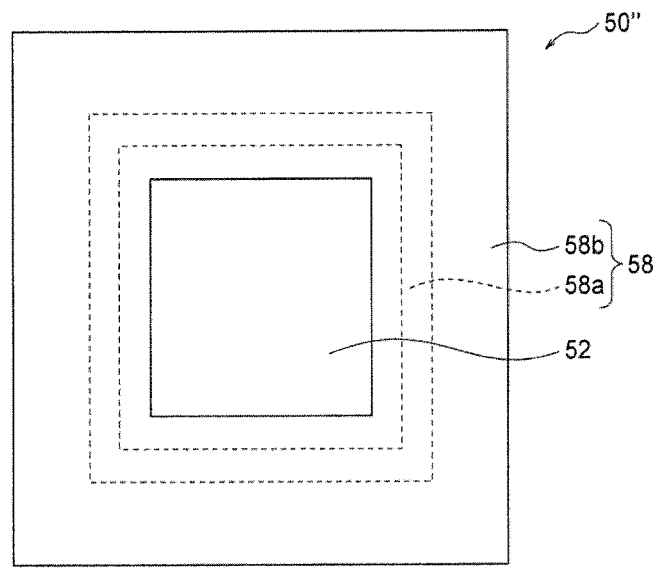
FIG. 6A is a schematic top view of a separator structure according to still another embodiment of the present invention.
Figure 6B:
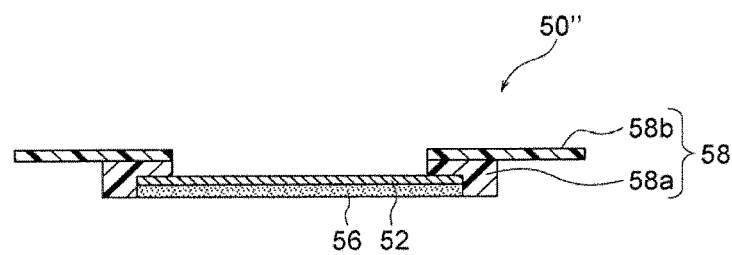
FIG. 6B is a schematic cross-sectional view of the separator structure of FIG. 6A.

If the separator structure 50" comprises both the frame 58a and the resin film 58b as illustrated in FIGS. 6A and 6B, the frame 58a is preferably bonded to the resin film 58b by thermal fusion or with an adhesive. In such a case, the adhesive is preferably an epoxy resin adhesive in view of particularly high alkali resistance. A hot-melt adhesive may also be used. As described above, the thermal fusion may be performed through any known technique, such as laser welding, thermocompression bonding, hot plate welding, ultrasonic welding, or high-frequency welding. The thermal fusion is preferably performed with, for example, a commercially available heat sealer in view of ease of bonding and sealing.

The ceramic separator 52 (hereinafter referred to as "separator 52") has hydroxide ion conductivity and water impermeability, and is typically in a plate, membrane, or layer form. As used herein, the term "water impermeability" indicates that water in contact with one surface of an analyte (e.g., the LDH membrane and/or the porous substrate) does not reach the other surface during the "density evaluation test" performed in Example 1 described below or any other equivalent method or system. The water impermeability of the separator 52 indicates that the separator 52 has a density sufficiently high to prevent the permeation of water and is not a porous film or porous material having water permeability. Thus, this configuration is very effective for physically inhibiting the penetration of dendritic zinc (which may be formed during a charge mode of the battery) through the separator, to prevent the short circuit between the positive and negative electrodes. As illustrated in FIGS. 4A to 6B, the separator 52 may be provided with a porous substrate 56. In any case, the hydroxide ion conductivity of the separator 52 leads to efficient migration of hydroxide ions between the positive and negative electrodes, resulting in charge/discharge reaction between these electrodes.

Figure 20:
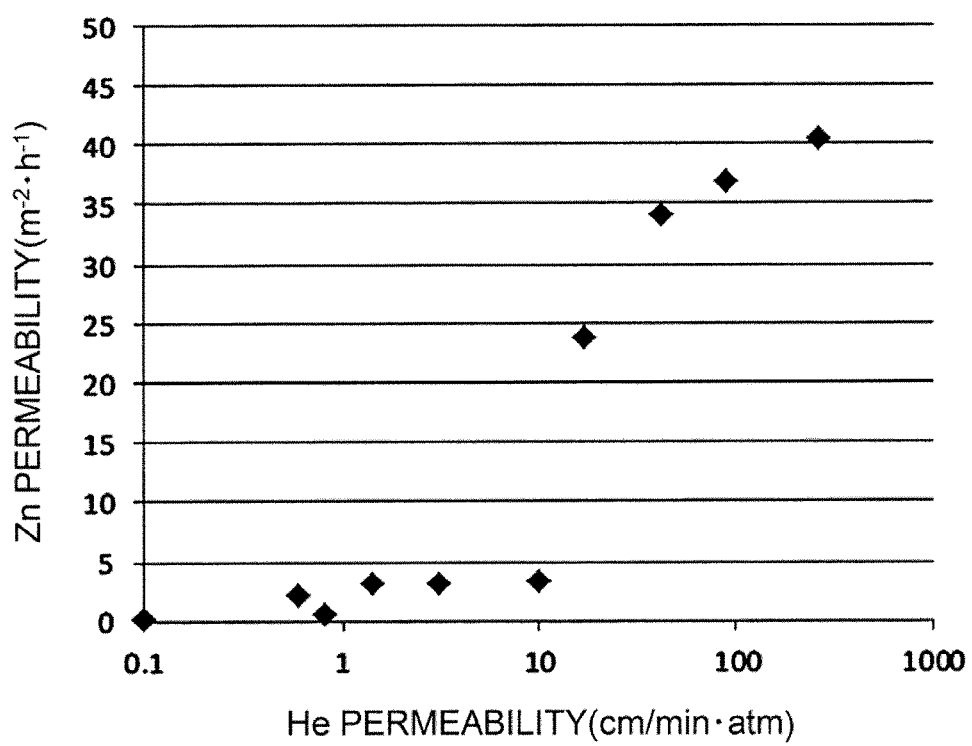
FIG. 20 is a graph showing the relationship between He permeability and Zn permeability determined in Example A5.

The separator 52 has a He permeability per unit area of preferably 10 cm/min·atm or less, more preferably 5.0 cm/min·atm or less, further preferably 1.0 cm/min·atm or less. A separator having a He permeability of 10 cm/min·atm or less can effectively prevent permeation of Zn in an electrolytic solution. For example, as illustrated in FIG. 20, a He permeability of 10 cm/min·atm or less leads to a significant reduction in Zn permeability per unit area as determined by the contact of the membrane with water. The upper limit of He permeability of 10 cm/min·atm is critical for the hydroxide-ion-conductive separator to exhibit the effect of reducing Zn permeation. Thus, the separator of the present embodiment significantly reduces Zn permeation. In principle, the use of such a separator for a nickel-zinc secondary battery can effectively prevent growth of dendritic zinc. Accordingly, the present invention provides a high-density hydroxide-ion-conductive membrane that can significantly reduce permeation of substances other than hydroxide ions (in particular, Zn, which may cause growth of dendritic zinc in a zinc secondary battery) and that is particularly suitable for use in, for example, a separator for a battery (in particular, a zinc secondary battery, which may cause growth of dendritic zinc). The determination of He permeability involves a step of feeding He gas to one surface of the separator so that the He gas permeates the dense membrane, and a step of evaluating the density of the separator on the basis of the calculated He permeability. The He permeability is calculated by the expression $F/(P \times S)$ where F represents the amount of He gas permeated per unit time, P represents a differential pressure applied to the separator during permeation of He gas, and S represents the area of the membrane through which He gas permeates. Such determination of the He gas permeability leads to highly accurate evaluation of the density of the membrane, resulting in effective evaluation of a density sufficient to prevent permeation (to allow permeation of very small amounts) of substances other than hydroxide ions (in particular, Zn, which may cause growth of dendritic zinc). This effective evaluation is attributed to the following fact. He gas has very low reactivity and consists not of molecules but of He atoms each being the smallest in size among various gaseous atoms and molecules. In contrast, hydrogen gas consists of $H_2$ molecules each being larger in size than a He atom, and $H_2$ gas is dangerous due to its combustibility. The He gas permeability determined by the aforementioned expression can be used for the objective and convenient evaluation of density, regardless of the size of a sample or the conditions of measurement. Thus, the He permeability can be used for conveniently, safely, and effectively determining whether the separator has a sufficiently high density suitable for use as a separator for a nickel-zinc battery. The He permeability is preferably determined through the procedure described below in Example 5.

The separator 52 has a Zn permeability per unit area of preferably 10 $m^{-2} \cdot h^{-1}$ or less, more preferably 5.0 $m^{-2} \cdot h^{-1}$ or less, still more preferably 4.0 $m^{-2} \cdot h^{-1}$ or less, still more preferably 3.0 $m^{-2} \cdot h^{-1}$ or less, still more preferably 1.0 $m^{-2} \cdot h^{-1}$ or less, as determined by the contact of the membrane with water. Such a low Zn permeability indicates that the permeation of Zn through the separator is very effectively prevented in an electrolytic solution. In principle, the use of such a separator for a nickel-zinc secondary battery can effectively prevent growth of dendritic zinc. The determination of Zn permeability involves a step of causing Zn to permeate the separator for a predetermined period of time, and a step of calculating Zn permeability. Zn is caused to permeate the separator by bringing one surface of the separator into contact with a first aqueous solution containing Zn, and bringing the other surface of the separator into contact with water or a second aqueous solution not containing Zn. The Zn permeability is calculated by the expression $(C_2 \times V_2)/(C_1 \times V_1 \times t \times S)$ where $C_1$ represents the Zn concentration of the first aqueous solution before the permeation of Zn, $V_1$ represents the volume of the first aqueous solution before the permeation of Zn, $C_2$ represents the Zn concentration of the second aqueous solution or water after the permeation of Zn, $V_2$ represents the volume of the second aqueous solution or water after the permeation of Zn, t represents the permeation time of Zn, and S represents the area of the membrane through which Zn permeates. The parameters $C_1$, $C_2$, $V_1$, $V_2$, t, and S each may have any unit if the concentrations $C_1$ and $C_2$ have the same unit and the volumes $V_1$ and $V_2$ have the same unit. Preferably, the permeation time t of Zn has a unit of h, and the area S of the membrane has a unit of $m^2$. The Zn concentration $C_1$ of the first aqueous solution before the permeation of Zn is preferably 0.001 to 1 mol/L, more preferably 0.01 to 1 mol/L, still more preferably 0.05 to 0.8 mol/L, particularly preferably 0.2 to 0.5 mol/L, most preferably 0.35 to 0.45 mol/L. The permeation time of Zn is preferably 1 to 720 hours, more preferably 1 to 168 hours, still more preferably 6 to 72 hours, particularly preferably 12 to 24 hours. Such determination of the Zn permeability with an aqueous Zn-containing solution and an aqueous Zn-free solution leads to highly accurate evaluation of the density of the membrane, resulting in reliable and precise evaluation of a density sufficient to prevent permeation (to allow permeation of a very small amount) of Zn, which may cause growth of dendritic zinc in a zinc secondary battery. The Zn permeability determined by the aforementioned expression can be used for the objective and convenient evaluation of density, regardless of the size of a sample or the conditions of measurement. The Zn permeability can be used as an effective index for determining the degree of precipitation of dendritic zinc, for the following reason. In principle, the use of the hydroxide-ion-conductive dense membrane as a separator for a zinc secondary battery can effectively prevent growth of dendritic zinc in a Zn-free electrolytic solution (at the positive electrode) if Zn contained in an electrolytic solution (at the zinc negative electrode) in contact with one surface of the separator does not permeate the separator into the originally Zn-free electrolytic solution in contact with the other surface of the separator. According to this embodiment, the Zn permeability can be used for reliably and accurately determining whether the separator has a sufficiently high density suitable for use as a separator for a nickel-zinc battery. The Zn permeability is preferably determined through the procedure described below in Example 5.

The separator 52 is preferably composed of an inorganic solid electrolyte exhibiting hydroxide ion conductivity. The use of the separator composed of a hydroxide-ion-conductive inorganic solid electrolyte as the separator 52 separates the electrolytic solutions between the positive and negative electrodes, and ensures conduction of hydroxide ions. The inorganic solid electrolyte constituting the separator 52 is typically a dense and hard inorganic solid electrolyte, and thus can physically inhibits the penetration of dendritic zinc (which may be formed during a charge mode of the battery) through the separator, to prevent the short circuit between the positive and negative electrodes, resulting in significantly improved reliability of the nickel-zinc battery. The inorganic solid electrolyte is desirably densified to exhibit water impermeability. For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense but brittle in the solution. Any process other than hydrothermal treatment may be used for producing a dense and hard inorganic solid electrolyte.

The separator 52 or the inorganic solid electrolyte may be in the form of a composite body containing particles of an organic solid electrolyte exhibiting hydroxide ion conductivity and an auxiliary component that promotes the densification or hardening of the particles. Alternatively, the separator 52 may be in the form of a composite body containing a porous body serving as a substrate and an inorganic solid electrolyte (e.g., a layered double hydroxide) that is precipitated and grown in pores of the porous body. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH) having a basic composition represented by the general formula: $M^{2+}_{1-x}M^{3+}_{x}(OH)_2 A^{n-}_{x/n} \cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is 0 or more). The inorganic solid electrolyte is more preferably composed of such an LDH. In the general formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3^{2-}$. In the general formula, preferably, $M^{2+}$ comprises $Mg^{2+}$, $M^{3+}$ comprises $Al^{3+}$, and $A^{n-}$ comprises $OH^-$ and/or $CO_3^{2-}$. In the general formula, n is an integer of 1 or more, preferably 1 or 2; x is 0.1 to 0.4, preferably 0.2 to 0.35; and m is 0 or more, typically a real or integer number exceeding 0 or not less than 1. In the general formula, $M^{3+}$ may be partially or entirely replaced with a cation having a valency of 4 or more. In such a case, the coefficient x/n of the anion $A^{n-}$ in the general formula may be appropriately varied.

The inorganic solid electrolyte is preferably densified through hydrothermal treatment. The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate treated in a pressure container at a temperature of 120 to 250° C., preferably 180 to 250° C. for 2 to 24 hours, preferably 3 to 10 hours. A more preferred process involving the hydrothermal treatment will be described below.

A porous substrate 56 may be disposed on either or both of the surfaces of the separator 52. When the porous substrate 56 is disposed on one surface of the separator 52, the porous substrate may be disposed on a surface of the separator 52 facing toward the negative electrode or on a surface of the separator 52 facing toward the positive electrode. The porous substrate 56 has water permeability, and thus the positive-electrode electrolytic solution and the negative-electrode electrolytic solution permeate the substrate and reach the separator. The presence of the porous substrate 56 leads to reliable retention of hydroxide ions on the separator 52. The strength imparted by the porous substrate 56 can reduce the thickness of the separator 52, resulting in a reduction in resistance. A dense membrane or layer of the inorganic solid electrolyte (preferably LDH) may be formed on or in the porous substrate 56. The disposition of the porous substrate on one surface of the separator 52 probably involves a process including preparation of the porous substrate 56 and formation of a membrane of the inorganic solid electrolyte on the porous substrate (this process will be described below). In contrast, the disposition of the porous substrate on the two surfaces of the separator 52 probably involves a process including densification of the raw powder of the inorganic solid electrolyte disposed between two porous substrates. With reference to FIGS. 4A to 6B, the porous substrate 56 is disposed entirely on one surface of the separator 52. Alternatively, the porous substrate 56 may be disposed only on a portion (e.g., a region responsible for charge/discharge reaction) of one surface of the separator 52. For example, the formation of a membrane or layer of the inorganic solid electrolyte on or in the porous substrate 56 typically leads to the process-derived structure; i.e., the porous substrate is disposed entirely on one surface of the separator 52. In contrast, the formation of an independent plate of the inorganic solid electrolyte (having no substrate) may involve the subsequent step of disposing the porous substrate 56 on a portion (e.g., a region responsible for charge/discharge reaction) or the entirety of one surface of the separator 52.

The inorganic solid electrolyte may be in a plate, membrane, or layer form. The inorganic solid electrolyte in a membrane or layer form is preferably disposed on or in the porous substrate. The inorganic solid electrolyte in the form of a plate has a sufficient hardness and effectively prevents the penetration of dendritic zinc. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in the form of a plate has a thickness of preferably 0.01 to 0.5 mm, more preferably 0.02 to 0.2 mm, still more preferably 0.05 to 0.1 mm. The inorganic solid electrolyte preferably exhibits a high hydroxide ion conductivity. The inorganic solid electrolyte typically exhibits a hydroxide ion conductivity of $10^{-4}$ to $10^{-1}$ S/m. The inorganic solid electrolyte in a membrane or layer form has a thickness of preferably 100 µm or less, more preferably 75 µm or less, still more preferably 50 µm or less, particularly preferably 25 µm or less, most preferably 5 µm or less. Such a small thickness achieves a reduction in resistance of the separator 52. The lower limit of the thickness may vary depending on the intended use of the inorganic solid electrolyte. The thickness is preferably 1 µm or more, more preferably 2 µm or more in order to secure a hardness required for a separator membrane or layer.

The battery container, to which the separator structure is to be attached, accommodates at least the negative electrode and the alkaline electrolytic solution. The battery container is preferably composed of a resin. In a common zinc secondary battery (e.g., a nickel-zinc battery), the battery container may accommodate the positive electrode and the positive-electrode electrolytic solution. In the case of a zinc-air secondary battery including an air electrode serving as a positive electrode, the air electrode (positive electrode) is not necessarily accommodated in the battery container and may be disposed (e.g., in the form of a lid) to simply cover the opening of the container. In any case, the container preferably has a structure exhibiting liquid tightness and gas tightness. If the container is composed of a resin, the resin preferably has resistance to an alkali metal hydroxide, such as potassium hydroxide. The resin is more preferably a polyolefin resin, an ABS resin, or a modified polyphenylene ether, still more preferably an ABS resin or a modified polyphenylene ether.

Figure 2:
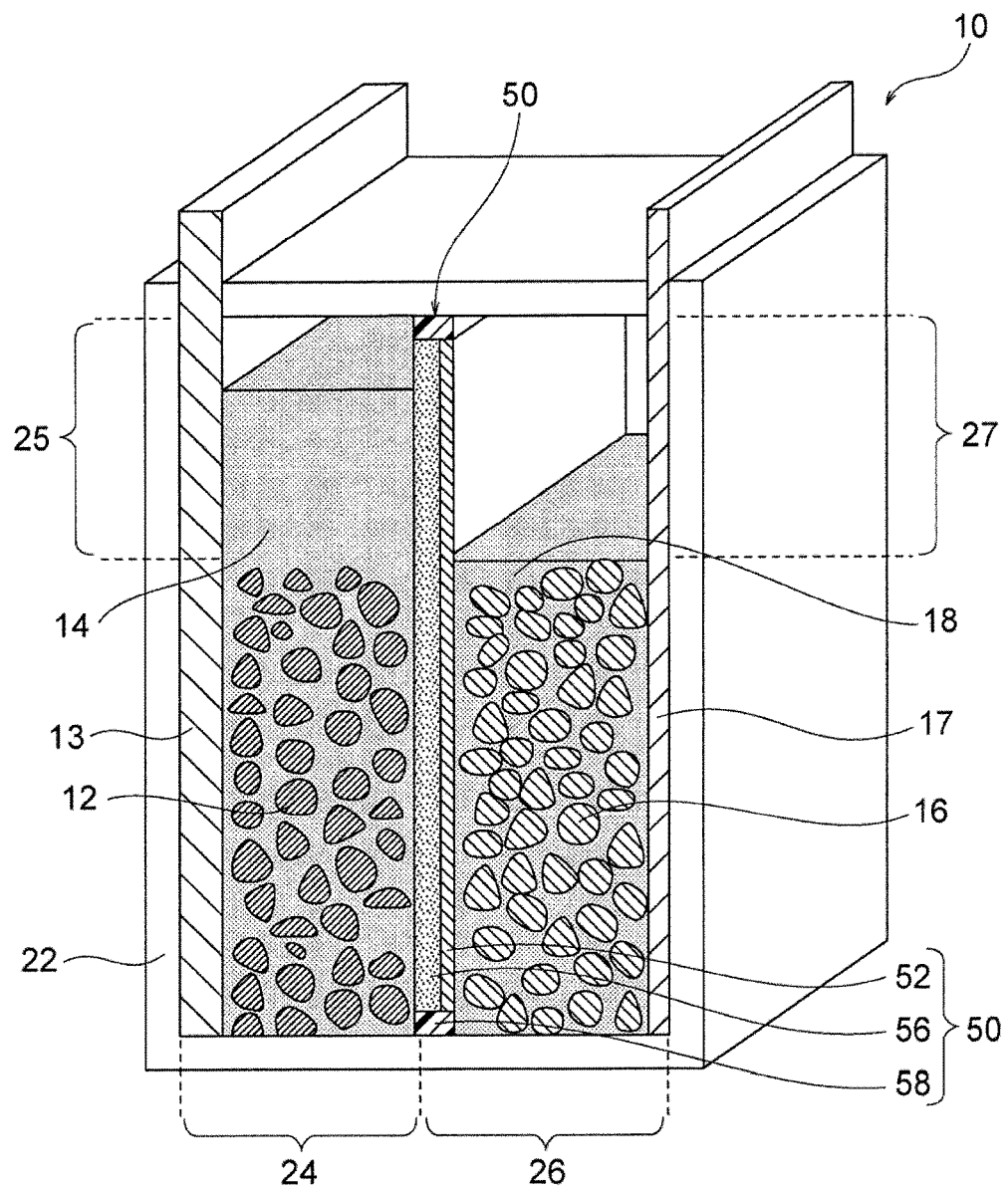
FIG. 2 illustrates the full charge state of the nickel-zinc battery of FIG. 1.

FIG. 1 is a schematic illustration of an exemplary nickel-zinc battery including a separator structure. FIG. 1 illustrates the initial state (i.e., discharge end state) of the nickel-zinc battery before charging. It should be understood that the nickel-zinc battery according to this embodiment may be in a full charge state. As illustrated in FIG. 1, the nickel-zinc battery 10 according to this embodiment includes a container 22, and the container 22 includes a positive electrode 12, a positive-electrode electrolytic solution 14, a negative electrode 16, a negative-electrode electrolytic solution 18, and a separator structure 50. The positive electrode 12 contains nickel hydroxide and/or nickel oxyhydroxide. The positive-electrode electrolytic solution 14 is an alkaline electrolytic solution containing an alkali metal hydroxide. The positive electrode 12 is immersed in the positive-electrode electrolytic solution 14. The negative electrode 16 contains zinc and/or zinc oxide. The negative-electrode electrolytic solution 18 is an alkaline electrolytic solution containing an alkali metal hydroxide. The negative electrode 16 is immersed in the negative-electrode electrolytic solution 18. The container 22 accommodates the positive electrode 12, the positive-electrode electrolytic solution 14, the negative electrode 16, the negative-electrode electrolytic solution 18, and the separator structure 50. The positive electrode 12 is not necessarily separated from the positive-electrode electrolytic solution 14, and the positive electrode 12 and the positive-electrode electrolytic solution 14 may be combined into a positive-electrode mixture. Similarly, the negative electrode 16 is not necessarily separated from the negative-electrode electrolytic solution 18, and the negative electrode 16 and the negative-electrode electrolytic solution 18 may be combined into a negative-electrode mixture. A positive-electrode collector 13 is optionally disposed in contact with the positive electrode 12, and a negative-electrode collector 17 is optionally disposed in contact with the negative electrode 16. The nickel-zinc battery 10 preferably has an extra positive-electrode space 25 in the positive-electrode chamber 24. The extra positive-electrode space 25 has a volume that meets a variation in amount of water in association with the reaction at the positive electrode during charge/discharge of the battery. Also, the nickel-zinc battery 10 preferably has an extra negative-electrode space 27 in the negative-electrode chamber 26. The extra negative-electrode space 27 has a volume that meets a variation in amount of water in association with the reaction at the negative electrode during charge/discharge of the battery. Most traditional separators exhibit water permeability and thus allow water to pass therethrough freely. In contrast, the separator 52 used in this embodiment has high density and water impermeability. Hence, water cannot pass through the separator 52 freely, and an increase in amount of the electrolytic solution in the positive-electrode chamber 24 and/or the negative-electrode chamber 26 during charge/discharge of the battery may cause problems, such as liquid leakage. As illustrated in FIG. 2, the positive-electrode chamber 24 has the extra positive-electrode space 25 having a volume that meets a variation in amount of water in association with the reaction at the positive electrode during charge/discharge of the battery, and thus the extra positive-electrode space 25 can buffer an increase in amount of the positive-electrode electrolytic solution 14 during a charge mode. Since the extra positive-electrode space 25 serves as a buffer even after full charge as illustrated in FIG. 2, an increased amount of the positive-electrode electrolytic solution 14 can be reliably retained in the positive-electrode chamber 24 without causing overflow of the electrolytic solution. Similarly, the negative-electrode chamber 26 has the extra negative-electrode space 27 having a volume that meets a variation in amount of water in association with the reaction at the negative electrode during charge/discharge of the battery, and thus the extra negative-electrode space 27 can buffer an increase in amount of the negative-electrode electrolytic solution 18 during a discharge mode.

Figure 3A:
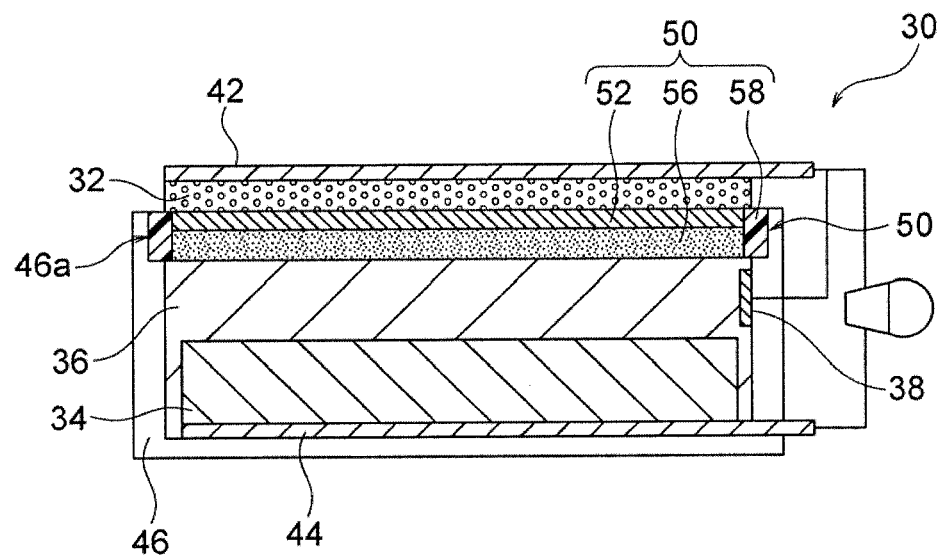
FIG. 3A is a schematic illustration of an exemplary zinc-air secondary battery including a separator structure of the present invention.
Figure 3B:
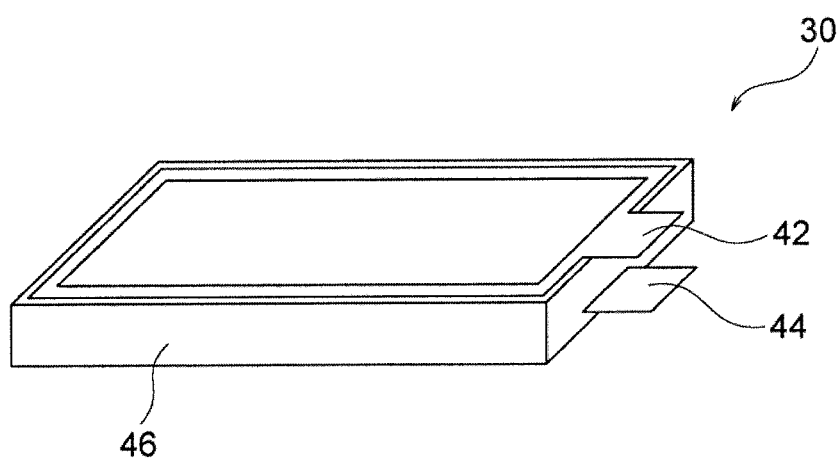
FIG. 3B is a perspective view of the zinc-air secondary battery of FIG. 3A.

FIGS. 3A and 3B are schematic illustrations of an exemplary zinc-air secondary battery including a separator structure. As illustrated in FIGS. 3A and 3B, the zinc-air secondary battery 30 according to this embodiment includes an air electrode 32, a negative electrode 34, an alkaline electrolytic solution 36, a separator structure 50, a container 46, and optionally a third electrode 38. The air electrode 32 functions as a positive electrode. The negative electrode 34 contains zinc, a zinc alloy, and/or a zinc compound. The electrolytic solution 36 is an aqueous electrolyte in which the negative electrode 34 is immersed. The container 46 has an opening 46a and accommodates the negative electrode 34, the electrolytic solution 36, and optionally the third electrode 38. The separator structure 50 is disposed to cover the opening 46a such that the separator 40 is in contact with the electrolytic solution 36 and defines a negative-electrode hermetic space with the resin container 46, whereby the air electrode 32 is separated from the electrolytic solution 36 by the separator 40 through which hydroxide ions pass. A positive-electrode collector 42 is optionally disposed in contact with the air electrode 32, and a negative-electrode collector 44 is optionally disposed in contact with the negative electrode 34. In such a case, the negative-electrode collector 44 is also accommodated in the container 46. The third electrode 38 may optionally be disposed so as to be in contact with the electrolytic solution 36, but not in contact with the negative electrode 34. In such a case, the third electrode 38 is connected to the air electrode 32 via an external circuit. With this configuration, hydrogen gas generated from the negative electrode 34 by the side reaction comes into contact with the third electrode 38 to produce water. In other words, hydrogen gas generated from the negative electrode 34 is absorbed by the third electrode 38, leading to self-discharge. This configuration prevents an increase in pressure in the negative-electrode hermetic space due to generation of hydrogen gas, and avoids problems caused by the increased pressure. This configuration also prevents water loss in the negative-electrode hermetic space through generation of water (which is lost through the aforementioned discharge reaction). The third electrode 38 may be any electrode that is connected to the air electrode 32 via an external circuit and that can convert hydrogen gas ($H_2$) into water ($H_2O$) through the aforementioned reactions. The third electrode 38 preferably has an oxygen overvoltage higher than that of the air electrode 32. Preferably, the third electrode 38 is not involved in a common charge/discharge reaction. The third electrode 38 preferably contains platinum and/or a carbonaceous material, and more preferably contains a carbonaceous material.

LDH Separator with Porous Substrate

Figure 7:
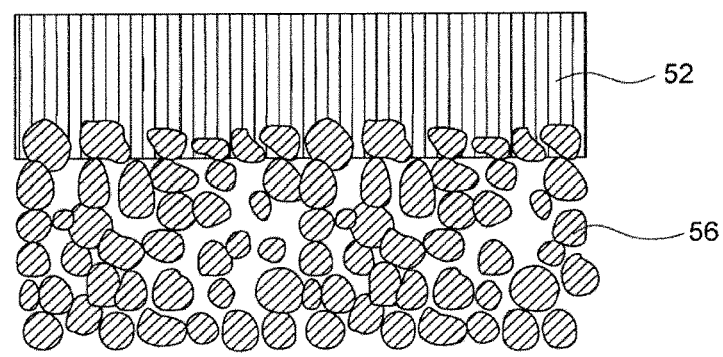
FIG. 7 is a schematic cross-sectional view of a separator provided with a porous substrate in an embodiment.
Figure 8:
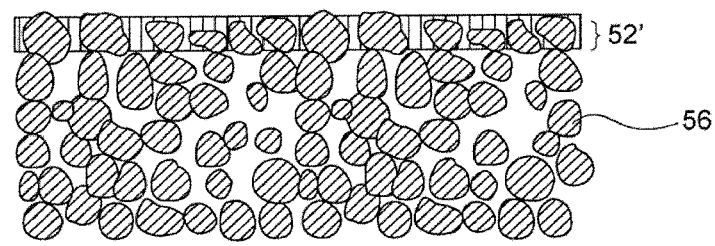
FIG. 8 is a schematic cross-sectional view of a separator provided with a porous substrate in another embodiment.

As described above, the separator structure of the present invention preferably includes the separator provided with the porous substrate. The separator is composed of a hydroxide-ion-conductive inorganic solid electrolyte, and the porous substrate is disposed on at least one surface of the separator. The inorganic solid electrolyte is in the form of a membrane or layer densified enough to have water impermeability. The particularly preferred separator provided with the porous substrate includes a porous substrate and a separator layer formed on and/or in the porous substrate. The separator layer contains the aforementioned layered double hydroxide (LDH). The separator layer preferably exhibits water impermeability and gas impermeability. The porous substrate exhibits water permeability and gas permeability because of the presence of pores, while the separator layer composed of LDH is preferably densified to exhibit water impermeability and gas impermeability. The separator layer is preferably formed on the porous substrate. As illustrated in FIG. 7, it is preferred that the separator layer 52 in the form of an LDH dense membrane be formed on the porous substrate 56. In view of the characteristics of the porous substrate 56, LDH particles may be formed in pores in the surface and its vicinity as illustrated in FIG. 7. Alternatively, as illustrated in FIG. 8, LDH may be densely formed in the porous substrate 56 (e.g., in pores in the surface and its vicinity of the porous substrate 56) such that at least a portion of the porous substrate 56 forms the separator layer 52'. The separator illustrated in FIG. 8 has a structure prepared by removal of a portion corresponding to the membrane of the separator layer 52 of the separator illustrated in FIG. 5 The separator may have any other structure such that the separator layer is disposed parallel to the surface of the porous substrate 56. In any case, the separator layer composed of LDH is highly-densified and thus exhibits water impermeability and gas impermeability. Thus, the separator layer exhibits particular characteristics, i.e. hydroxide ion conductivity, water impermeability and gas impermeability (i.e., the layer basically allows only hydroxide ions to pass therethrough).

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. The porous substrate preferably has a water-permeable porous structure because such a porous structure enables an electrolytic solution to come into contact with the separator layer in the case of the use of the layer as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, poly(phenylene sulfide), hydrophilized fluororesins (e.g., poly(tetrafluoroethylene) (PTFE)), and any combination thereof. More preferably, a material having alkali resistance (i.e., resistance to an electrolytic solution of a battery) is appropriately selected from among the preferred materials described above.

The porous substrate has an average pore size of preferably 0.001 to 1.5 µm, more preferably 0.001 to 1.25 µm, still more preferably 0.001 to 1.0 µm, particularly preferably 0.001 to 0.75 µm, most preferably 0.001 to 0.5 µm. These ranges make it possible to form a dense LDH-containing separator exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. The pore sizes can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH-containing separator layer that exhibits water impermeability, while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the porous substrate by image processing. More preferably, the porosities in three 6 µm×6 µm areas selected at random are averaged for objective evaluation.

The separator layer is formed on and/or in the porous substrate, preferably on the porous substrate. For example, the separator layer 52 formed on the porous substrate 56 as illustrated in FIG. 7 is in the form of an LDH dense membrane, and the LDH dense membrane is typically composed of LDH. The separator layer 52' formed in the porous substrate 56 as illustrated in FIG. 8 is typically composed of at least a portion of the porous substrate 56 and LDH because LDH is densely formed in the porous substrate 56 (typically in pores in the surface and its vicinity of the porous substrate 56). The separator layer 52' illustrated in FIG. 8 is prepared through removal of a membrane portion of the separator layer 52 illustrated in FIG. 7 by any known technique, such as polishing or machining.

The separator layer preferably exhibits water impermeability and gas impermeability. For example, if water is brought into contact with one surface of the separator layer at 25° C. for one week, water does not permeate the separator layer, and if helium gas is fed to one surface of the separator layer under application of a differential pressure of 0.5 atm, helium gas does not permeate the separator layer. Preferably, the separator layer composed of LDH is densified to exhibit water impermeability and gas impermeability. If the dense membrane has local and/or incidental defects exhibiting water permeability, the defects may be filled with an appropriate repairing agent (e.g., an epoxy resin) for ensuring water impermeability and gas impermeability. Such a repairing agent does not necessarily exhibit hydroxide ion conductivity. The surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the separator layer by image processing. More preferably, the porosities in three 6 µm×6 µm areas selected at random are averaged for objective evaluation.

Preferably, the layered double hydroxide is composed of an aggregation of platy particles (i.e., platy LDH particles), and these platy particles are oriented such that the tabular faces of the platy particles are substantially perpendicular to or oblique to the surface of the porous substrate (i.e., the substrate surface). In particular, this preferred embodiment is applied to the case where the separator layer 52 is disposed in the form of an LDH dense membrane on the porous substrate 56 as illustrated in FIG. 7. Alternatively, this embodiment may be applied to the case where LDH is densely formed in the porous substrate 56 (typically in pores in the surface and its vicinity of the porous substrate 56), and at least a portion of the porous substrate 56 constitutes the separator layer 52' as illustrated in FIG. 8.

Figure 9:
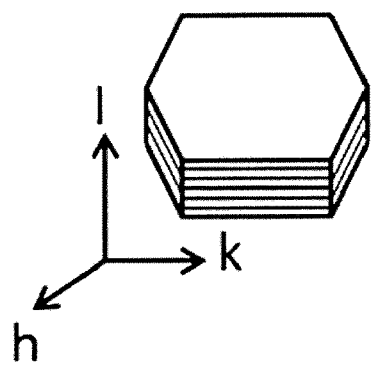
FIG. 9 is a schematic illustration of a platy particle of layered double hydroxide (LDH).

As illustrated in FIG. 9, the LDH crystal is in the form of a platy particle with a layered structure. The substantially perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the applicant has revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing separator layer according to the present embodiment fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the substantially perpendicular direction. If the platy LDH particles are highly orientated in the substantially perpendicular direction, the X-ray diffractometry of the surface of the separator layer shows substantially no peak of (003) plane or a peak of (003) plane smaller than that of (012) plane (note: this shall not apply to the case where the porous substrate shows a peak at the same angle as the peak of (012) plane of the platy LDH particles, because the peak of (012) plane of the platy LDH particles cannot be specified). This characteristic peak profile indicates that the platy LDH particles of the separator layer are oriented substantially perpendicular to (i.e, perpendicular to or nearly perpendicular to, and preferably perpendicular to) the separator layer. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented substantially perpendicular to the separator layer. The reason for this is as follows: The c planes (00l) including the (003) plane (where l is 3 or 6) are parallel to the layers of platy LDH particles. If the platy LDH particles are oriented substantially perpendicular to the separator layer, the layers of platy LDH particles are also substantially perpendicular to the separator layer and thus the X-ray diffractometry of the surface of the separator layer shows no peak or very small peak of (00l) plane (where l is 3 or 6). The peak of (003) plane, if present, tends to be stronger than the peak of (006) plane, and the use of the peak of (003) plane facilitates determination of the substantially perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 μm or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. The separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The LDH separator with the porous substrate is preferably produced through a method involving (a) providing a porous substrate, (b) evenly depositing a material for generating a species from which LDH crystal growth starts (i.e., a material for starting crystal growth) on the porous substrate if needed, and (c) hydrothermally treating the porous substrate to form an LDH membrane.

(a) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material tends to improve the density of a LDH membrane. In the case of a ceramic porous substrate, the porous substrate is preferably subjected to, for example, ultrasonic cleaning or cleaning with ion-exchange water.

As described above, the porous substrate is more preferably composed of a ceramic material. The ceramic porous substrate may be a commercially available one or may be prepared by any known process. For example, the ceramic porous substrate may be prepared as follows: Ceramic powder (e.g., zirconia powder, boehmite powder, or titania powder), methyl cellulose, and ion-exchange water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of ion-exchange water is preferably 10 to 100 parts by weight relative to 100 parts by weight of the ceramic powder.

(b) Deposition of Material for Starting Crystal Growth

If needed, a material for generating a species from which LDH crystal growth starts may be evenly deposited on the porous substrate. The even deposition of such a material on the surface of the porous substrate and the subsequent step (c) can form a highly-densified LDH membrane evenly on the porous substrate. Preferred examples of the species from which LDH crystal growth starts include chemical species generating an anion that can enter between layers of LDH, chemical species generating a cation that can constitute LDH, and LDHs.

(i) Anion-Generating Chemical Species

The LDH crystal growth may start from a chemical species generating an anion that can enter between LDH layers. Examples of the anion include $CO_3^{2-}$, $OH^-$, $SO_3^-$, $SO_3^{2-}$, $SO_4^{2-}$, $NO_3^-$, $Cl^-$, $Br^-$, and any combination thereof. A material for generating such a species may be evenly deposited on the surface of the porous substrate by a process suitable for the material. The deposition of such an anion-generating chemical species on the surface of the porous substrate leads to adsorption of a metal cation (e.g., $Mg^{2+}$ or $Al^{3+}$) on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate after the deposition of a polymer on the surface of the porous substrate and subsequent introduction of an anion-generating chemical species into the polymer. In this embodiment, the anion is preferably $SO_3^-$, $SO_3^{2-}$, and/or $SO_4^{2-}$. Such an anion-generating chemical species is preferably introduced into the polymer through sulfonation. The polymer may be an anionizable (in particular, sulfonatable) polymer. Examples of such a polymer include polystyrene, polyether sulfone, polypropylene, epoxy resins, poly(phenylene sulfide), and any combination thereof. Aromatic polymers are particularly preferred because they are readily anionized (in particular, sulfonated). Examples of the aromatic polymers include polystyrene, polyether sulfone, epoxy resins, poly(phenylene sulfide), and any combination thereof. Most preferred is polystyrene. The deposition of the polymer on the porous substrate preferably involves application of a polymer solution to the surface of the porous substrate (preferably, to particles forming the outermost surface of the platy porous substrate). The polymer solution can be readily prepared by, for example, dissolution of a solid polymer (e.g., a polystyrene substrate) in an organic solvent (e.g., xylene). In view of even application of the polymer solution, the solution is preferably applied to the porous substrate such that the solution does not permeate the substrate. Thus, spin coating is preferred for very even deposition or application of the polymer solution. The spin coating may be performed under any conditions; for example, a rotation speed of 1,000 to 10,000 rpm and an operational period of about 60 to 300 seconds (involving dropwise addition and drying). The sulfonation may be performed by immersing the polymer-deposited porous substrate in an acid for sulfonating the polymer, such as sulfuric acid (e.g., concentrated sulfuric acid), fuming sulfuric acid, chlorosulfonic acid, and sulfuric anhydride. Any other sulfonation techniques may also be used. The porous substrate may be immersed in such a sulfonating acid at room temperature or a high temperature (e.g., 50 to 150° C.) for any period of time (e.g., 1 to 14 days).

In another preferred embodiment of the present invention, the material for starting crystal growth may be deposited on the porous substrate by treatment of the surface of the substrate with a surfactant containing an anion-generating chemical species as a hydrophilic moiety. In this embodiment, the anion is preferably $SO_3^-$, $SO_3^{2-}$, and/or $SO_4^{2-}$. Typical examples of such a surfactant include anionic surfactants. Preferred examples of the anionic surfactant include sulfonate anionic surfactants, sulfate anionic surfactants, and any combination thereof. Examples of the sulfonate anionic surfactants include (sodium naphthalenesulfonate)-formalin condensate, disodium polyoxyethylene alkyl sulfosuccinate, poly(sodium styrenesulfonate), sodium dioctyl sulfosuccinate, and polyoxyethylene lauryl ether sulfate triethanolamine. Examples of the sulfate anionic surfactants include sodium polyoxyethylene lauryl ether sulfate. The porous substrate may be treated with a surfactant by any process that can deposit the surfactant on the surface of the substrate; for example, application of a surfactant-containing solution to the porous substrate, or immersion of the porous substrate in a surfactant-containing solution. The porous substrate may be immersed in the surfactant-containing solution with agitation of the solution at room temperature or a high temperature (e.g., 40 to 80° C.) for any period of time (e.g., one to seven days).

(ii) Cation-Generating Chemical Species

The LDH crystal growth may start from a chemical species generating a cation that can constitute the layered double hydroxide. Such a cation is preferably $Al^{3+}$, for example. In this case, the material for starting crystal growth is preferably at least one aluminum compound selected from the group consisting of oxides, hydroxides, oxyhydroxides, and hydroxy complexes of aluminum. A material for generating such a chemical species may be evenly deposited on the surface of the porous substrate by a process suitable for the material. The deposition of such a cation-generating chemical species on the surface of the porous substrate leads to adsorption of an anion that can enter between layers of LDH on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate by application of a sol containing an aluminum compound to the porous substrate. Preferred examples of the aluminum compound include boehmite (AlOOH), aluminum hydroxide ($Al(OH)_3$), and amorphous alumina. Most preferred is boehmite. Spin coating is preferably used for very even application of the sol containing the aluminum compound. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by hydrothermal treatment of the porous substrate in an aqueous solution containing at least aluminum to form an aluminum compound on the surface of the porous substrate. The aluminum compound to be formed on the surface of the porous substrate is preferably $Al(OH)_3$. The LDH membrane on the porous substrate (in particular, a ceramic porous substrate) tends to form crystalline and/or amorphous $Al(OH)_3$ at the initial growth stage. LDH growth may start from the $Al(OH)_3$ serving as a nucleus. Thus, the hydrothermal treatment step (c) after even deposition of $Al(OH)_3$ on the surface of the porous substrate by hydrothermal treatment can evenly form a highly-densified LDH membrane on the surface of the porous substrate. In this embodiment, steps (b) and (c) may be continuously performed in the same hermetic container, or may be sequentially performed in separate containers.

If steps (b) and (c) are continuously performed in the same hermetic container, an aqueous stock solution used in step (c) (i.e., an aqueous solution containing an element constituting LDH) may be used in step (b). In such a case, the hydrothermal treatment in step (b) is performed in a hermetic container (preferably an autoclave) in an acidic or neutral pH range (preferably at a pH of 5.5 to 7.0) at a relatively low temperature of 50 to 70° C., to promote nucleation of $Al(OH)_3$, instead of LDH. After the nucleation of $Al(OH)_3$, the aqueous stock solution is maintained at the nucleation temperature or heated from the temperature, to promote hydrolysis of urea, resulting in an increase in pH of the aqueous stock solution. Thus, step (b) is smoothly followed by step (c) in a pH range suitable for LDH growth (preferably a pH of more than 7.0).

If steps (b) and (c) are sequentially performed in separate containers, it is preferred that different aqueous stock solutions be used for steps (b) and (c). For example, step (b) preferably involves the use of an aqueous stock solution primarily containing an Al source (preferably, not containing a metal other than Al) for nucleation of $Al(OH)_3$. In this case, the hydrothermal treatment in step (b) may be performed at 50 to 120° C. in a hermetic container (preferably an autoclave) different from that used in step (c). Preferred examples of the aqueous stock solution primarily containing an Al source include an aqueous solution containing aluminum nitrate and urea but not containing a magnesium compound (e.g., magnesium nitrate). The use of the Mg-free aqueous stock solution can avoid precipitation of LDH, resulting in promotion of nucleation of $Al(OH)_3$.

In another preferred embodiment of the present invention, the material for starting crystal growth may be deposited on the porous substrate by vapor deposition of aluminum on the surface of the porous substrate and then conversion of the aluminum into an aluminum compound through hydrothermal treatment in an aqueous solution. The aluminum compound is preferably $Al(OH)_3$. In particular, the conversion of aluminum into $Al(OH)_3$ promotes LDH growth from the $Al(OH)_3$ serving as a nucleus. Thus, step (c) of hydrothermal treatment after even formation of Al(OH)$_3$ on the surface of the porous substrate by hydrothermal treatment can evenly form a highly-densified LDH membrane on the surface of the porous substrate. The vapor deposition of aluminum may involve physical or chemical vapor deposition, and preferably involves physical vapor deposition, such as vacuum deposition. The hydrothermal treatment for conversion of aluminum into Al(OH)$_3$ may use any aqueous solution containing a component that can react with the deposited Al to form Al(OH)$_3$.

(iii) LDH as Material for Starting Crystal Growth

The crystal growth may start from LDH. In this case, LDH growth may start form LDH serving as a nucleus. The even deposition of the LDH nucleus on the surface of the porous substrate and subsequent step (c) can form a highly-densified LDH membrane evenly on the porous substrate.

In a preferred embodiment of the present invention, the material for starting crystal growth may be deposited on the porous substrate by application of an LDH-containing sol to the surface of the porous substrate. The LDH-containing sol may be prepared by dispersion of LDH in a solvent, such as water. In this embodiment, spin coating is preferably used for very even application of the LDH-containing sol. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by vapor deposition of aluminum on the surface of the porous substrate and then conversion of the (vapor-deposited) aluminum into LDH through hydrothermal treatment in an aqueous solution containing an element constituting LDH other than aluminum. The vapor deposition of aluminum may involve physical or chemical vapor deposition, and preferably involves physical vapor deposition, such as vacuum deposition. The hydrothermal treatment for conversion of aluminum into LDH may use an aqueous stock solution containing a component other than the vapor-deposited Al. Preferred examples of the aqueous stock solution include an aqueous stock solution primarily containing an Mg source. More preferred is an aqueous solution containing magnesium nitrate and urea but not containing an aluminum compound (e.g., aluminum nitrate). The use of the Mg source-containing aqueous solution results in nucleation of LDH together with the vapor-deposited Al.

(c) Hydrothermal Treatment

The porous substrate (on which the material for starting crystal growth may be deposited if needed) is hydrothermally treated in an aqueous stock solution containing the elements of LDH, to form the LDH membrane on the surface of the porous substrate. Preferably, the aqueous stock solution contains magnesium ions (Mg$^{2+}$) and aluminum ions (Al$^{3+}$) in a specific total concentration and further contains urea. Urea is hydrolyzed into ammonia and raises the pH of the aqueous stock solution (e.g., a pH of more than 7.0, preferably a pH of more than 7.0 and 8.5 or less), and metal ions co-existing in the aqueous stock solution form hydroxides, to produce LDH. The hydrolysis of urea, which also generates carbon dioxide, can form LDH having carbonate ions as anions. The aqueous stock solution contains magnesium ions (Mg$^{2+}$) and aluminum ions (Al$^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, high-density LDH membrane. At a low total concentration of magnesium ions and aluminum ions, the crystal growth dominates over the nucleation, resulting in a decrease in number of LDH particles and an increase in size of the LDH particles. At a high total concentration, the nucleation dominates over the crystal growth, resulting in an increase in number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions (NO$_3^-$) (i.e., urea/NO$_3^-$) in the aqueous stock solution is preferably 2 to 6, more preferably 4 to 5.

The porous substrate may be immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate).

The porous substrate is hydrothermally treated in the aqueous stock solution to form the LDH membrane on the surface of the porous substrate. The hydrothermal treatment is performed in a hermetic container (preferably an autoclave) at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH membrane produced as described above is composed of densely assembled platy LDH particles that are oriented in the substantially perpendicular direction, which is beneficial for the conductivity. The LDH membrane typically exhibits water impermeability (preferably both water impermeability and gas impermeability) because of its high density.

The LDH membrane is typically composed of an agglomeration of platy particles, and these platy particles are oriented such that the tabular faces of the platy particles are substantially perpendicular to or oblique to the surface of the porous substrate. Thus, the use of the dense LDH membrane having sufficient gas-tight properties in batteries (e.g., zinc-air batteries) will lead to an improvement in electricity generating capacity. Furthermore, the dense LDH membrane is expected to be used in novel applications, such as a separator that can prevent growth of dendritic zinc and permeation of carbon dioxide, which have been large technical barriers against forming a zinc-air secondary battery containing an electrolytic solution that has not been achieved. The dense LDH membrane can also be used in a separator for a nickel-zinc battery that has suffered from growth of dendritic zinc which is an obstacle to practical use of this battery.

The above-described method may form LDH membranes on the two surfaces of the porous substrate. Thus, in order to modify the LDH-containing composite material into a form suitable for use as a separator, the LDH membrane on one surface of the porous substrate is preferably removed through mechanical polishing after the formation of the LDH membranes. Alternatively, it is desirable to take a measure to prevent formation of the LDH membrane on one surface of the porous substrate.

EXAMPLES

The present invention will now be described in more detail by way of Examples. Many of the following Examples correspond to Referential Examples relating to the preparation and evaluation of an LDH separator provided with a porous substrate and having no peripheral member. The properties and evaluations described in the following Referential Examples are also applied to a secondary battery including the separator structure of the present invention provided with a peripheral member.

Example 1 (Reference): Preparation and Evaluation of LDH Separator with Porous Substrate (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 10:
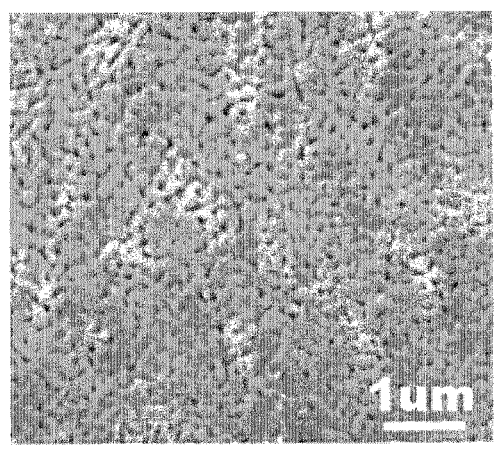
FIG. 10 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by using tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 10 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view are then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon container (with an internal volume of 800 mL and a stainless steel jacket). The porous substrate was horizontally suspended and away from the bottom of the hermetic Teflon container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A Layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 11:
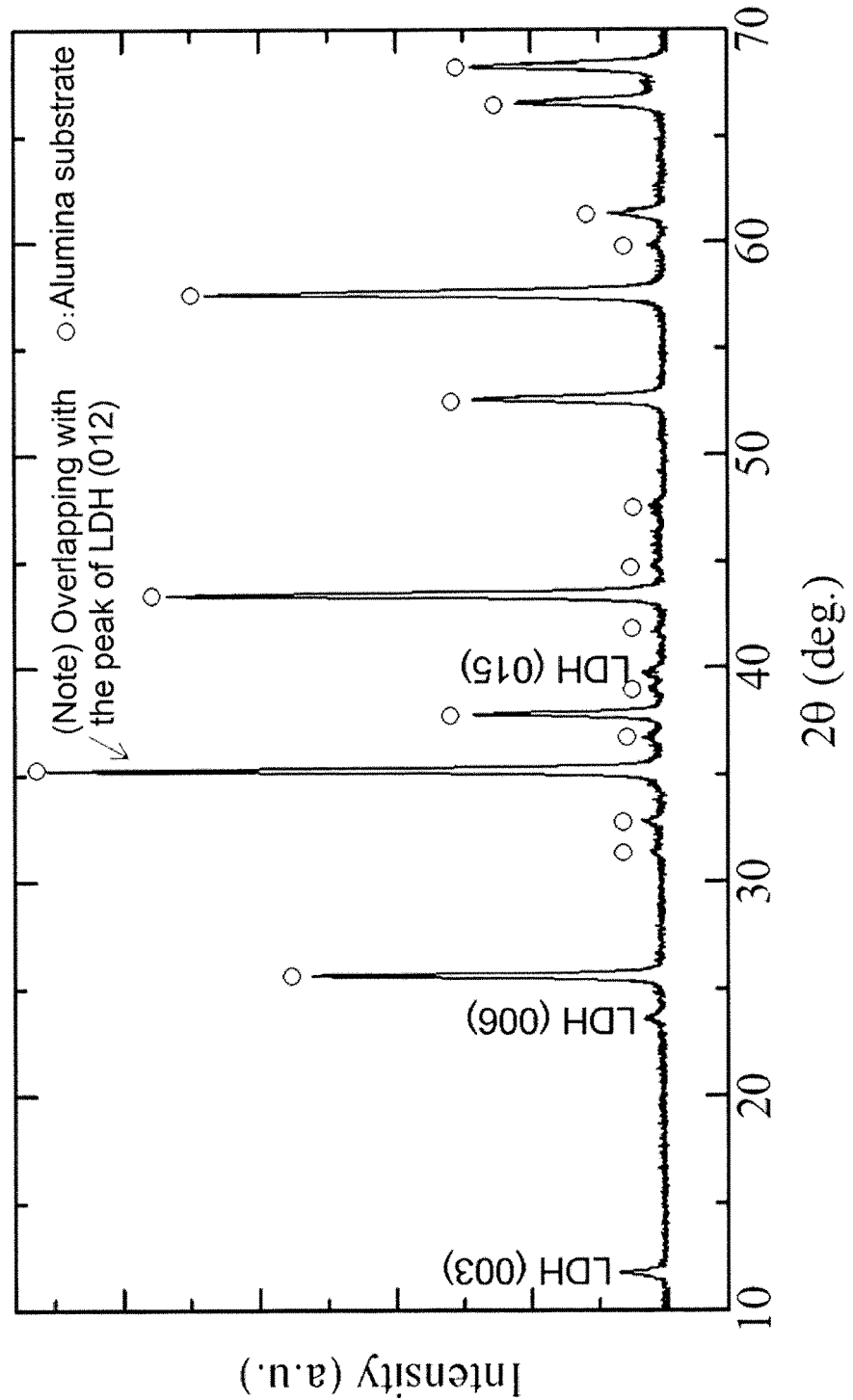
FIG. 11 is an XRD profile of a crystalline phase of a sample in Example 1.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 11. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 11, peaks derived from alumina in the porous substrate on which the membrane sample was formed (i.e., the peaks marked with a circle) were also observed.

(5b) Observation of Microstructure

Figure 12:
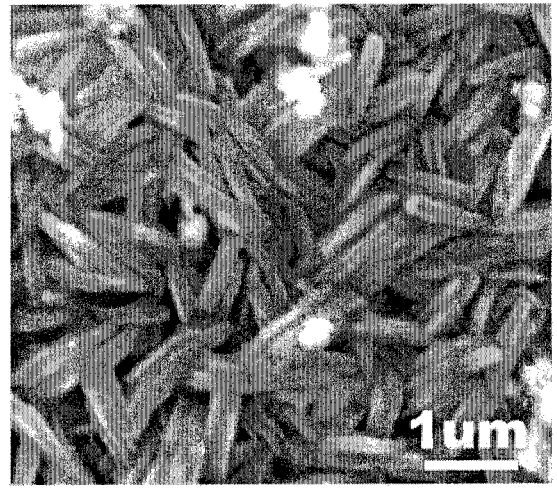
FIG. 12 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 12 illustrates the resultant SEM image (i.e., a secondary electron image) of the surface microstructure of the membrane sample.

Figure 13:
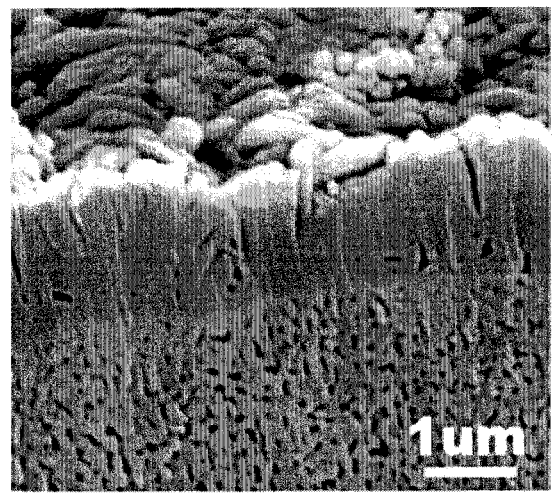
FIG. 13 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 13 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by histogram thresholding with tools named [image], [color compensation], and [binarization] in this order; and 4) the porosity (%) was determined by dividing the number of pixels of the black areas by the number of all the pixels of the image. The porosity was determined over a 6 µm×6 µm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of the membrane sample was also determined. The porosity was determined as in the above procedure except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Evaluation of Density I

Figure 14A:
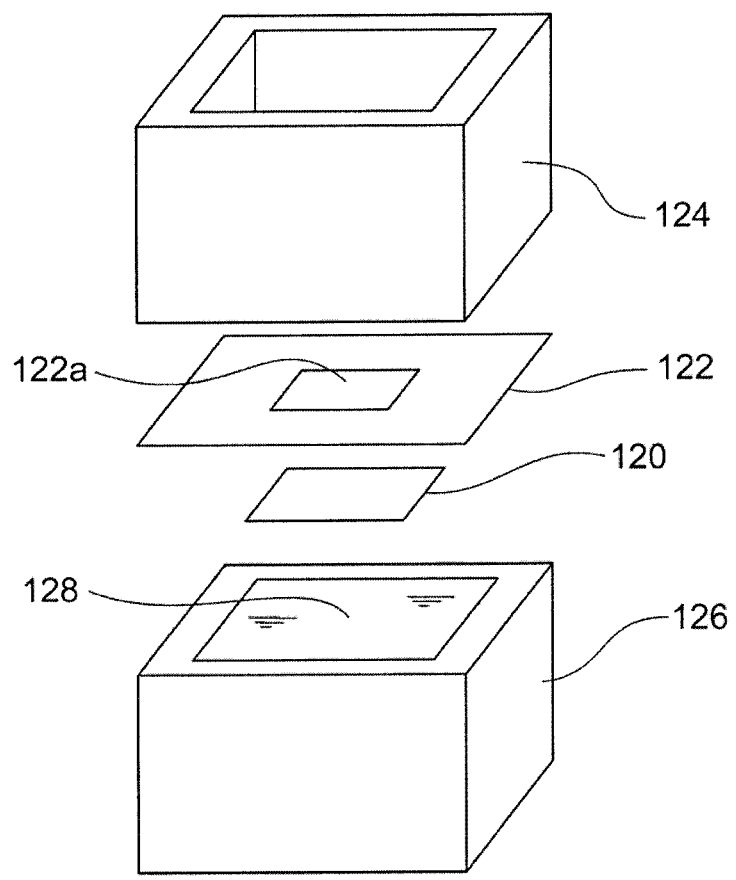
FIG. 14A is an exploded perspective view of a system for evaluating and measuring density in Example 1.
Figure 14B:
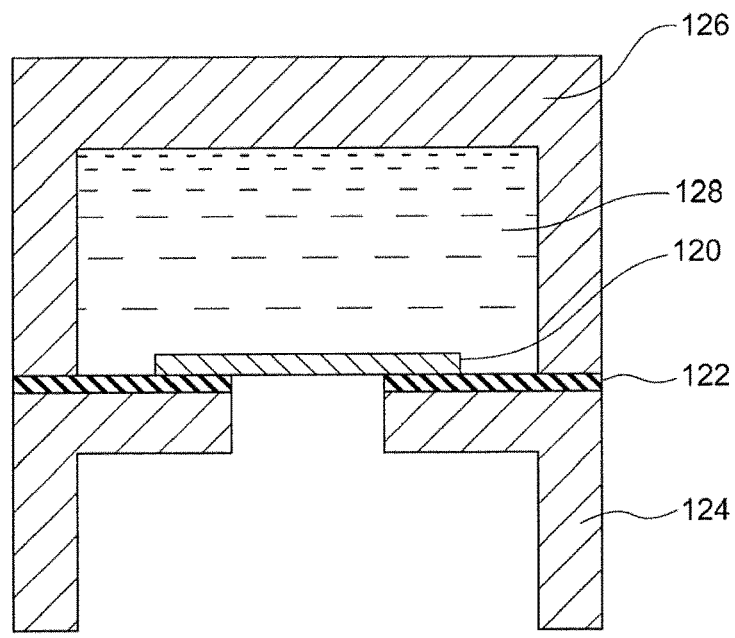
FIG. 14B a schematic cross-sectional view of a system for evaluating and measuring density in Example 1.

A density evaluation test was performed on the membrane sample for determining whether the sample has high density and thus water impermeability. With reference to FIG. 14A, a silicone rubber 122 having a central opening 122a (0.5 cm×0.5 cm) was bonded to the membrane sample of composite material sample 120 prepared in (1) above (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122a is exposed. The acrylic unit 126 disposed on the porous substrate side in view of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It goes without saying that the unit 126 has a closed vent (not shown) and the vent is opened after inversion of the assembly. As illustrated in FIG. 14B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Evaluation of Density II

Figure 15A:
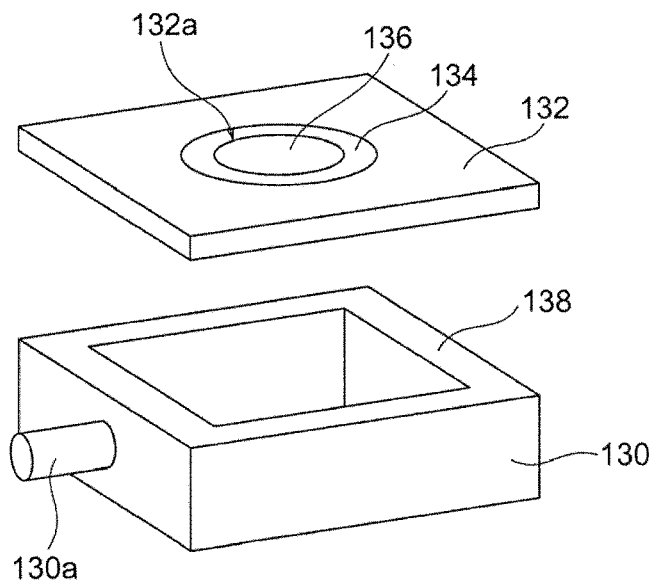
FIG. 15A is an exploded perspective view of a hermetic container used in density evaluation test II in Example 1.
Figure 15B:
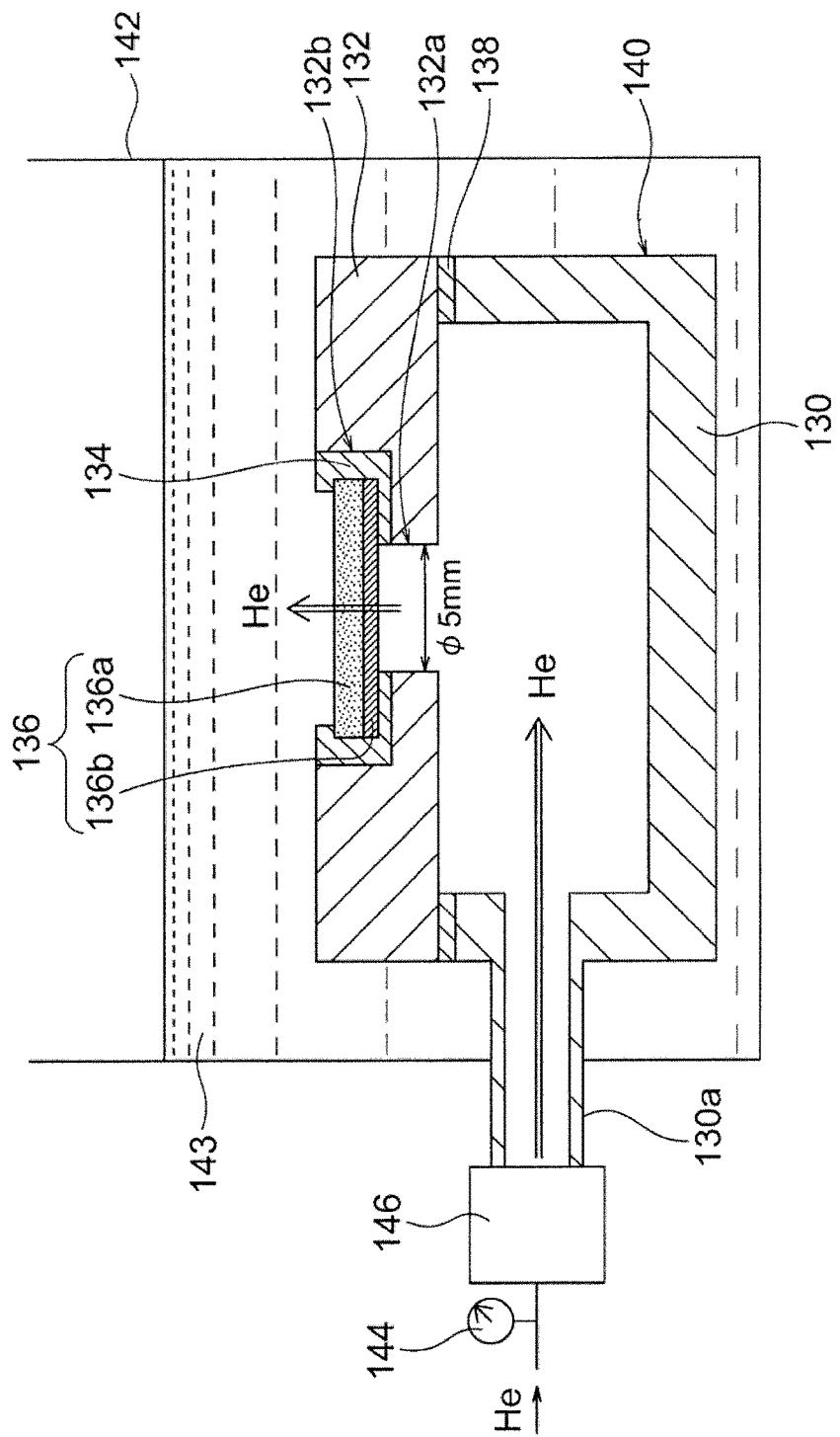
FIG. 15B is a schematic cross-sectional view of a system used in density evaluation test II in Example 1.

A density evaluation test was performed on the membrane sample for determining whether the sample has high density and thus gas impermeability. As illustrated in FIGS. 15A and 15B, an acrylic container 130 and an alumina jig 132 were provided. The container 130 has no lid, and the jig 132 has a shape and a size such that it serves as a lid for the container 130. The acrylic container 130 has a gas inlet 130a for feeding a gas into the container 130. The alumina jig 132 has an opening 132a having a diameter of 5 mm, and a dent 132b provided around the opening 132a for supporting the membrane sample. An epoxy adhesive 134 was applied to the dent 132b of the alumina jig 132, and a membrane sample 136b of a composite material sample 136 was placed on the dent 132b and gas- and liquid-tightly bonded to the alumina jig 132. The alumina jig 132 provided with the composite material sample 136 was gas- and liquid-tightly bonded to the upper edge of the acrylic container 130 with a silicone adhesive 138 so as to completely cover the opening of the acrylic container 130, to prepare a hermetic container 140 for evaluation. The hermetic container 140 was placed in a water bath 142, and the gas inlet 130a of the acrylic container 130 was connected to a pressure gauge 144 and a flowmeter 146 so as to allow helium gas to be fed into the acrylic container 130. Water 143 was poured into the water bath 142 such that the hermetic container 140 was completely submerged in the water. The hermetic container 140 was ensured to have gas tightness and liquid tightness. The membrane sample 136b of the composite material sample 136 was exposed to the inner space of the hermetic container 140, and the porous substrate 136a of the composite material sample 136 was in contact with the water in the water bath 142. Helium gas was fed into the hermetic container 140 through the gas inlet 130a of the acrylic container 130. The pressure gauge 144 and the flowmeter 146 were monitored to achieve a differential pressure of 0.5 atm at the membrane sample 136b (i.e., the pressure applied to the surface in contact with helium gas was higher by 0.5 atm than water pressure applied to the opposite surface), to determine the presence of helium gas bubbles in the water caused by permeation of helium gas through the composite material sample 136. No helium gas bubbles were observed. The results demonstrate that the membrane sample 136b has high density and thus gas impermeability.

Example 2: Production and Evaluation of Nickel-Zinc Battery (1) Preparation of Separator with Porous Substrate A separator provided with a porous substrate (LDH membrane on alumina substrate) (size: 5 cm×8 cm) was prepared as in Example 1.

(2) Preparation of Positive Electrode Plate

Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a current collector composed of a nickel porous substrate having a porosity of about 95% and dried so that the porosity of the positive-electrode active material was 50% to prepare a positive electrode plate having a region of 5 cm×5 cm coated with the active material. The amount of coating was adjusted so that the active material contained particulate nickel hydroxide corresponding to 4 Ah.

(3) Preparation of Negative Electrode Plate

A mixture of powdery zinc oxide (80 parts by weight), powdery zinc (20 parts by weight), and particulate polytetrafluoroethylene (3 parts by weight) was applied onto a current collector composed of punched copper sheet, to prepare a negative electrode plate having a porosity of about 50% and a region of 5 cm×5 cm coated with the active material. The amount of coating was adjusted so that the active material contained powdery zinc oxide corresponding to a positive electrode plate capacity of 4 Ah.

(4) Assembly of Battery

The positive electrode plate, the negative electrode plate, and the separator provided with the porous substrate were assembled as described below into a nickel-zinc secondary battery illustrated in FIG. 1.

A rectangular parallelepiped casing composed of ABS resin and having no lid was provided. The separator provided with the porous substrate (LDH membrane on alumina substrate) was placed near the center of the casing, and three edges of the separator were fixed to the inner wall of the casing with an epoxy-resin adhesive (EP008, manufactured by CEMEDINE Co., Ltd.). The positive electrode plate and the negative electrode plate were placed in a positive-electrode chamber and a negative-electrode chamber, respectively. The positive electrode plate and the negative electrode plate were disposed so that a positive-electrode current collector and a negative-electrode current collector came into contact with the inner wall of the casing. A 6 mol/L aqueous KOH solution, serving as an electrolytic solution, was injected into the positive-electrode chamber in an amount such that the region coated with the positive-electrode active material was completely submerged in the solution. A 6 mol/L aqueous KOH solution, serving as an electrolytic solution, was injected into the negative-electrode chamber in an amount such that the region coated with the negative-electrode active material was completely submerged in the solution. The amount of the electrolytic solution was adjusted so as to meet the amount of water that will decrease during a charge mode. The terminals of the positive-electrode current collector and the negative-electrode current collector were connected to external terminals provided at the top of the casing. A lid for the casing was fixed to the casing by thermal fusion to hermetically seal the battery casing. The nickel-zinc secondary battery was thereby produced. In the battery, the separator had a width of 5 cm and a height of 8 cm, and the region of the positive or negative electrode plates coated with the active material had a width of 5 cm and a height of 5 cm. Thus, an upper space of the positive-electrode or negative electrode chamber corresponding to a difference in height of 3 cm was respectively an extra positive-electrode or negative-electrode space.

(5) Evaluation

The resultant nickel-zinc secondary battery was subjected to constant-current charging for 10 hours (design capacity: 4 Ah, current: 0.4 mA corresponding to 0.1 C). Although the amount of the electrolytic solution increased in the positive-electrode chamber and the amount of the electrolytic solution decreased in the negative-electrode chamber through the charging, the region coated with the negative-electrode active material was immersed in a sufficient amount of the electrolytic solution. Thus, the electrolytic solution was retained in the casing in an amount sufficient for the charge/discharge reaction of the coated positive-electrode active material and negative-electrode active material through charge/discharge of the battery. Sufficient adhesion was maintained between the separator provided with the porous substrate and the rectangular parallelepiped casing composed of ABS resin.

Examples 3 (Reference): Production of Zinc-Air Secondary Battery (1) Preparation of Separator Provided with Porous Substrate A separator provided with a porous substrate (hereinafter referred to simply as "separator") (i.e., LDH membrane on alumina substrate) was prepared as in Example 1

(2) Preparation of Air Electrode Layer

Particulate α-$MnO_2$ serving as an air electrode catalyst was prepared as follows: $Mn(SO_4) \cdot 5H_2O$ and $KMnO_4$ were mixed in a molar ratio of 5:13 and dissolved in deionized water. The resultant mixture was poured into a stainless steel hermetic container lined with Teflon (registered trademark) and subjected to hydrothermal synthesis at 140° C. for two hours. The precipitate obtained through the hydrothermal synthesis was filtered, washed with distilled water, and then dried at 80° C. for six hours, to prepare particulate α-$MnO_2$.

A particulate layered double hydroxide (hereinafter referred to as "particulate LDH") serving as a hydroxide-ion-conductive material was prepared as follows: $Ni(NO_3)_2 \cdot 6H_2O$ and $Fe(NO_3)_3 \cdot 9H_2O$ were mixed (molar ratio of Ni:Fe=3:1) and dissolved in deionized water. The resultant mixture was added dropwise to a 0.3M $Na_2CO_3$ solution at 70° C. with agitation. The pH of the mixture was adjusted to 10 by addition of a 2M NaOH solution, and the mixture was maintained at 70° C. for 24 hours. The precipitate produced in the mixture was filtered, washed with distilled water, and then dried at 80° C., to prepare powdery LDH.

The particulate α-$MnO_2$, the particulate LDH, and carbon black (VXC72, manufactured by Cabot Corporation) serving as an electron conductive material were weighed in predetermined proportions and then wet-mixed in the presence of ethanol solvent. The resultant mixture was dried at 70° C. and then pulverized. The resultant powder was mixed with a binder (PTFE, EC-TEF-500ML, manufactured by ElectroChem) and water (1 mass % relative to the air electrode) to be fibrillated. The resultant fibrillary mixture was press-bonded to a collector (carbon cloth, EC-CC1-060T, manufactured by ElectroChem) into a sheet having a thickness of 50 μm, to prepare a laminate of an air electrode layer on the collector. The resultant air electrode layer contained the electron conductive phase (carbon black) in an amount of 20 vol. %, the catalyst layer (particulate α-$MnO_2$) in an amount of 5 vol. %, the hydroxide-ion-conductive phase (particulate LDH) in an amount of 70 vol. %, and the binder phase (PTFE) in an amount of 5 vol. %.

(3) Preparation of Air Electrode with Separator

An anion-exchange membrane (NEOSEPTA AHA, manufactured by ASTOM Corporation) was immersed in a 1M aqueous NaOH solution overnight. The anion-exchange membrane, serving as an intermediate layer, is disposed on the LDH membrane (separator), to prepare a laminate of the separator on the intermediate layer. The intermediate layer has a thickness of 30 The above-prepared air electrode layer/collector laminate is press-bonded to the separator/intermediate layer laminate such that the air electrode layer is in contact with the intermediate layer, to prepare an air electrode with the separator.

(4) Preparation of Negative Electrode Plate

A mixture of powdery zinc oxide (80 parts by weight), powdery zinc (20 parts by weight), and particulate polytetrafluoroethylene (3 parts by weight) is applied onto a collector composed of punched copper sheet, to prepare a negative electrode plate having a porosity of about 50% and a region coated with the active material.

(5) Preparation of Third Electrode

A platinum paste is applied to a nickel mesh collector to prepare a third electrode.

(6) Assembly of Battery

The air electrode with the separator, the negative electrode plate, and the third electrode are assembled into a horizontal zinc-air secondary battery illustrated in FIG. 3A through the procedure described below. A rectangular parallelepiped container composed of ABS resin and having no lid (hereinafter referred to as "resin container") is provided. The negative electrode plate is disposed on the bottom of the resin container such that the surface coated with the negative-electrode active material faces upward. The negative-electrode collector is in contact with the bottom of the resin container, and one end of the negative-electrode collector is connected to an external terminal penetrating through the side of the resin container. The third electrode is disposed on the inner wall of the resin container at a position above the top surface of the negative electrode (i.e., a position that is not in contact with the negative electrode and is not involved in the charge/discharge reaction), and a non-woven separator is disposed to come into contact with the third electrode. The opening of the resin container is covered with the air electrode with the separator such that the air electrode is exposed to the outside. In this case, an epoxy resin adhesive (EP008, manufactured by CEMEDINE Co., Ltd.) is applied to the periphery of the opening such that the opening is gas- and liquid-tightly sealed with the air electrode. A 6 mol/L aqueous KOH solution, serving as an electrolytic solution, is injected into the resin container through a small inlet provided near the top of the resin container. Thus, the separator is in contact with the electrolytic solution, and the electrolytic solution is always in contact with the third electrode because of the liquid-retaining ability of the non-woven separator despite a variation in amount of the electrolytic solution. In view of the production of the battery in a discharge end state, an excess amount of the electrolytic solution is injected into the resin container such that the region coated with the negative-electrode active material is completely submerged in the electrolytic solution in the container and the amount of the electrolytic solution meets the amount of water that will decrease during a charge mode. Thus, the resin container is designed so as to accommodate the excess amount of the electrolytic solution. The inlet of the resin container is then sealed. The space defined by the resin container and the separator is gas- and liquid-tightly sealed. The third electrode is then connected to the collector layer of the air electrode via an external circuit. The zinc-air secondary battery is thereby produced.

As described above, the separator exhibits high density and thus water impermeability and gas impermeability. This configuration of the zinc-air secondary battery physically inhibits the penetration of dendritic zinc (which may be formed during a charge mode of the battery) through the separator, to prevent the short circuit between the positive and negative electrodes. This configuration also inhibits the intrusion of carbon dioxide contained in air, to prevent precipitation of an alkaline carbonate (caused by carbon dioxide) in the electrolytic solution. In addition, hydrogen gas generated from the negative electrode 34 by the side reaction comes into contact with the third electrode 38 to produce water through the above-described reactions. Thus, the zinc-air secondary battery has a configuration suitable for preventing both the short circuit caused by dendritic zinc and the intrusion of carbon dioxide, and can address problems caused by the generation of hydrogen gas; i.e., the zinc-air secondary battery exhibits high reliability.

Example 4: Preparation of Separator Structure

Figure 16:
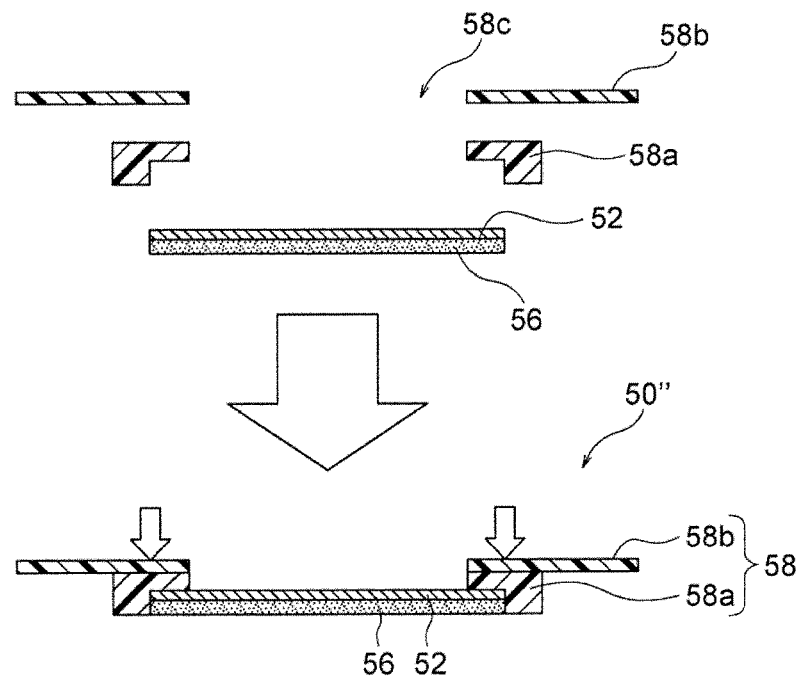
FIG. 16 illustrates a process of preparing the separator structure of FIG. 6A.
Figure 17:
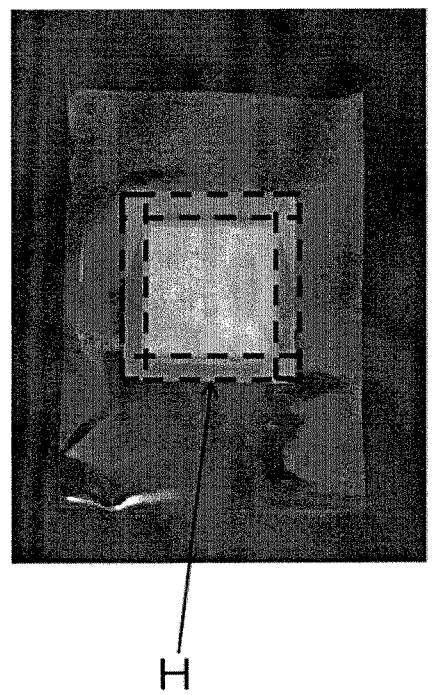
FIG. 17 is a photograph of the separator structure prepared in Example 4.

An LDH membrane disposed on an alumina substrate (i.e., a separator provided with a porous substrate) was prepared through the same procedure as in Example 1. As illustrated in FIGS. 6A and 16, a frame 58a composed of a modified polyphenylene ether resin was placed along the periphery of a separator 52 (i.e., an LDH membrane) provided with a porous substrate 56. The frame 58a had a square shape and an inner stepped edge. The peripheral edges of the porous substrate 56 and the separator 52 were fitted to the stepped edge. A resin film 58b having a central opening 58c was placed on the frame 58a. The resin film 58b was composed of a laminate film (trade name: Plastic Bag for Vacuum Sealer, manufactured by AS ONE Corporation, thickness: 50 μm, material: PP resin (base film) and PE resin (thermoplastic resin)). The resin film 58b was disposed on the frame 58a so that the opening 58c corresponded to the opening of the frame 58a. The joint between the resin frame 58a, the resin film 59b, and the separator 52 provided with the porous substrate 56 was sealed by thermal fusion with a commercially available heat sealer at about 200° C. FIG. 17 is a photograph of the resultant separator structure. The sealing by thermal fusion was performed on region H shown by dotted lines in FIG. 17. This region was ensured to have liquid tightness.

Example 5 (Reference): Preparation and Evaluation of LDH Separator with Porous Substrate In this example, samples 1 to 10; i.e., samples of layered double hydroxide (LDH)-containing composite material (samples of separator with porous substrate) were prepared by formation of an LDH dense membrane on a porous substrate.

(1) Preparation of Porous Substrate

Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at 1,150° C. for three hours, to prepare an alumina porous substrate.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Spin-Coating with Polystyrene and Sulfonation

For samples 1 to 6, each porous substrate was spin-coated with polystyrene and sulfonated through the following procedure. Specifically, a polystyrene substrate (0.6 g) was dissolved in xylene (10 mL) to prepare a coating solution having a polystyrene concentration of 0.06 g/mL. The coating solution (0.1 mL) was added dropwise and applied to the porous substrate by a spin coating process at 8,000 rpm for 200 seconds (including dropwise addition and drying). The spin-coated porous substrate was sulfonated through immersion in 95% sulfuric acid at 25° C. for four days.

(4) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(5) Formation of Membrane by Hydrothermal Treatment

The aqueous stock solution prepared in the above procedure (4) and the porous substrate sulfonated through procedure (3) (for samples 1 to 6) or the porous substrate cleaned in the above procedure (2) (for samples 7 to 10) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70 to 75° C. for 168 to 504 hours, to form oriented layered double hydroxide membranes on the surfaces of the substrate. Ten types of oriented membranes with different densities were prepared under appropriately selected conditions for the hydrothermal treatment. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.0 to 2.0 μm. LDH-containing composite material samples (hereinafter referred to as "composite material samples") were thereby prepared (samples 1 to 10). LDH membranes were formed on the opposite surfaces of the porous substrate. In order to use the composite material as a separator, the LDH membrane on one surface of the porous substrate was mechanically removed.

(6a) Identification of Membrane Sample

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile was compared with the diffraction peaks of a layered double hydroxide (or a hydrotalcite compound) described in JCPDS card No. 35-0964 for identification of the membrane sample. Each of membrane samples 1 to 10 was identified as a layered double hydroxide (LDH, or a hydrotalcite compound).

(6b) Determination of He Permeability

Figure 18A:
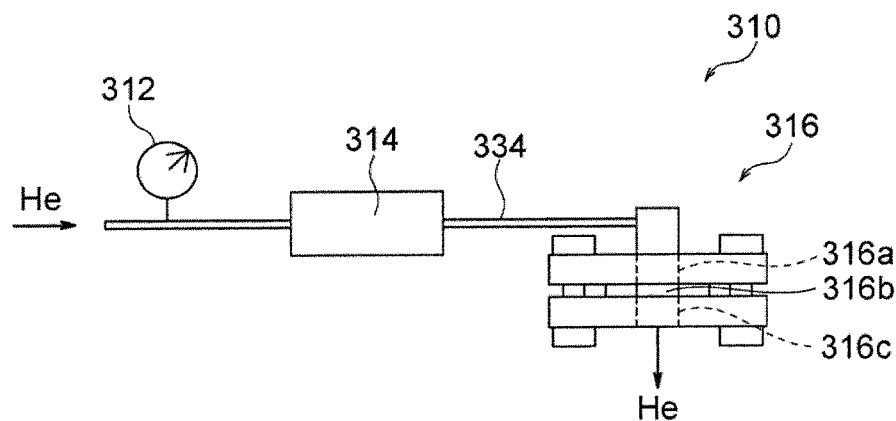
FIG. 18A is a schematic illustration of an exemplary system for determining He permeability.
Figure 18B:
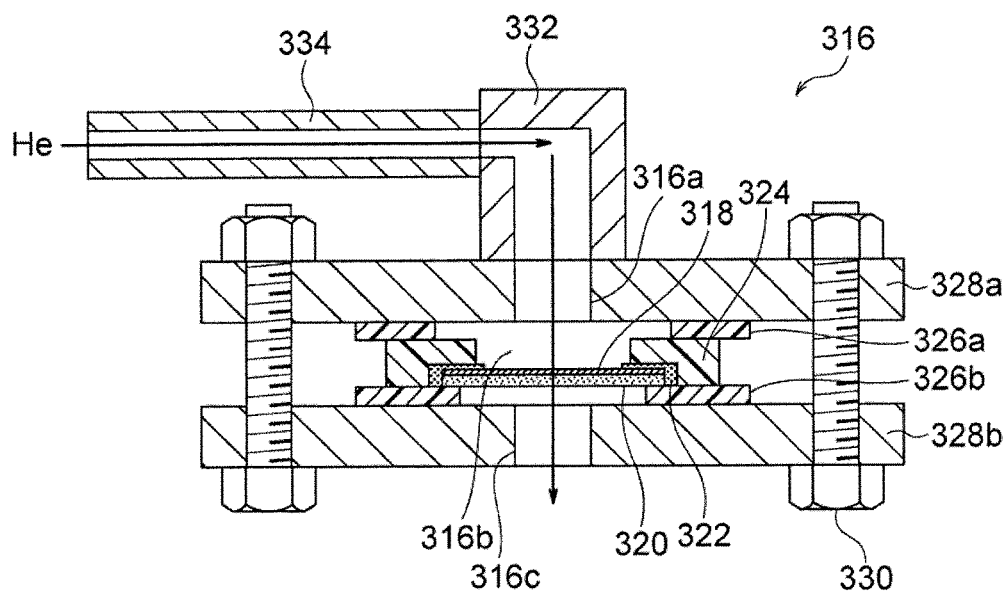
FIG. 18B is a schematic cross-sectional view of a sample holder used in the system illustrated in FIG. 18A and components provided around the sample holder.

The He permeabilities of membrane samples 1 to 10 were determined for evaluating the densities of these samples as follows. A He permeameter system 310 was provided as illustrated in FIGS. 18A and 18B. In the He permeameter system 310, He gas was fed from a He gas cylinder to a sample holder 316 through a pressure gauge 312 and a flowmeter 314 (digital flowmeter) and then fed to one surface of a dense membrane 318 held by the sample holder 316, so that the He gas permeated the dense membrane 18 end exited through the other surface.

The sample holder 316 including a gas inlet 316a, a hermetic space 316b, and a gas outlet 316c was assembled as follows. The dense membrane 318 was attached to a jig 324 (composed of ABS resin) having a central opening with an adhesive 322 applied to the periphery of the dense membrane 318. Sealing members (butyl rubber packings) 326a and 326b were respectively disposed on the upper and lower surfaces of the jig 324, and support members having openings (flanges) 328a and 328b composed of PTFE were respectively disposed on the sealing members 326a and 326b. Thus, the hermetic space 316b was defined by the dense membrane 318, the jig 324, the sealing member 326a, and the support member 328a. The dense membrane 318 was provided in the form of a composite material; i.e., the dense membrane 318 was disposed on the porous substrate 320 so as to face the gas inlet 316a. The support members 28a and 28b were fixed to each other with fasteners (screws) 330 so as to prevent leakage of He gas through sites other than the gas outlet 316c. A gas feeding tube 334 was connected to the gas inlet 16a of the sample holder 316 with a joint 332.

Subsequently, He gas was fed to the He permeameter system 310 through the gas feeding tube 334 so that the He gas permeated the dense membrane 318 held in the sample holder 316. The pressure and flow rate of the gas fed were monitored with the pressure gauge 312 and the flowmeter 314. The He permeability was calculated after the permeation of He gas for 1 to 30 minutes. The He permeability was calculated by the expression F/(P×S) where F represents the amount of He gas permeated per unit time (cm$^3$/min), P represents a differential pressure (atm) applied to the dense membrane during permeation of He gas, and S represents the area (cm$^2$) of the membrane through which He gas permeates. The amount F of He gas permeated (cm$^3$/min) was read directly from the flowmeter 314. The differential pressure P was a gauge pressure read from the pressure gauge 312. He gas was fed so as to achieve a differential pressure P of 0.05 to 0.90 atm. The results are shown in Table 1 and FIG. 20.

(6c) Determination of Zn Permeability

Figure 19A:
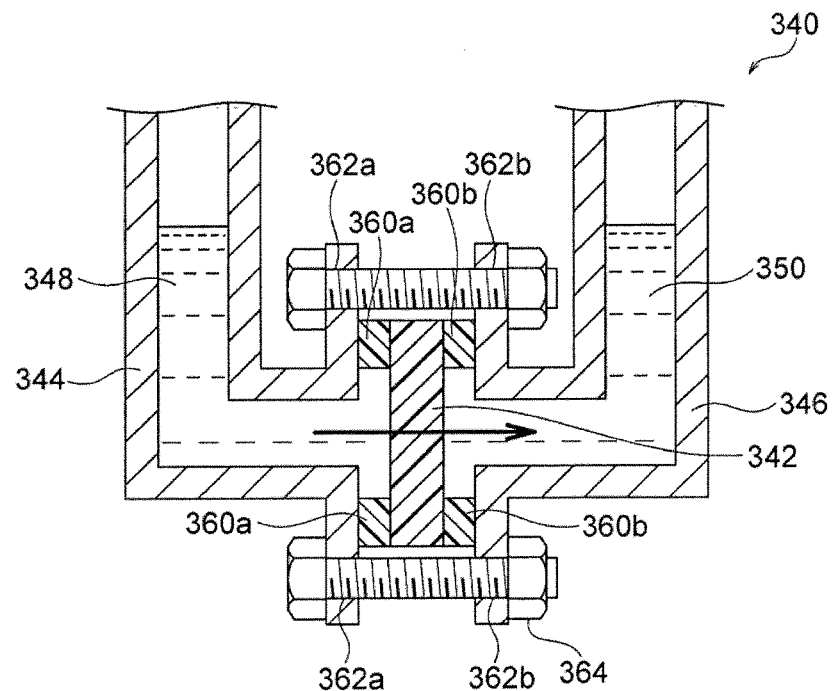
FIG. 19A is a schematic illustration of an exemplary device for determining Zn permeability.
Figure 19B:
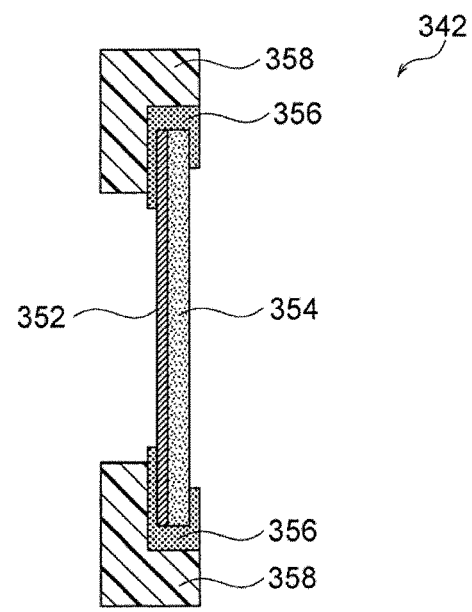
FIG. 19B is a schematic cross-sectional view of a sample holder used in the device illustrated in FIG. 19A.

The Zn permeabilities of membrane samples 1 to 10 were determined for evaluating the densities of these samples as follows. A Zn permeameter 340 was provided as illustrated in FIGS. 19A and 19B. In the Zn permeameter 340, a first vessel 344 composed of an L-shaped PTFE tube and combined with a flange 362a and a second vessel 346 composed of an L-shaped PTFE tube and combined with a flange 362b were disposed such that the flanges 362a and 362b faced each other. A sample holder 42 was disposed between the flanges 362a and 362b so that Zn might permeate the dense membrane held by the sample holder 342.

The sample holder 342 was assembled and attached to the permeameter 340 as follows. The dense membrane 352 was attached to a jig 358 (composed of ABS resin) having a central opening with an adhesive 356 applied to the periphery of the dense membrane 52. As illustrated in FIG. 19A, sealing members (e.g., silicone rubber packings) 360a and 360b were disposed on the opposite surfaces of the jig 358, and the paired flanges 362a and 362b were respectively disposed on the sealing members 360a and 360b. The dense membrane 352, which was provided on the porous substrate 354 (i.e., in the form of a composite material), was disposed so as to face the first vessel 344 (into which a first aqueous solution 348 containing Zn was to be injected). The flanges 362a and 362b were fastened to each other with fasteners (screws) 364 so as to prevent leakage of the liquid between the flanges 362a and 362b.

The first aqueous solution 348 for the first vessel 344 was a 9 mol/L aqueous KOH solution containing Al(OH)$_3$ (2.5 mol/L) and ZnO (0.5 mol/L). The Zn concentration $C_1$ (mol/L) of the first aqueous solution was measured by ICP atomic emission spectrometry. The results are shown in Table 1. The second aqueous solution 350 for the second vessel 346 was a 9 mol/L aqueous KOH solution containing Al(OH)$_3$ (2.5 mol/L) and not containing ZnO. In the permeameter 340 including the sample holder 342, the first aqueous solution 348 and the second aqueous solution 350 were respectively injected into the first vessel 344 and the second vessel 346 for permeation of Zn through the dense membrane 352 held by the sample holder 342. Thereafter, Zn was caused to permeate the dense membrane for a period of time t shown in Table 1. The volume $V_2$ (mL) of the second aqueous solution was then measured, and the Zn concentration $C_2$ (mol/L) of the second aqueous solution 350 was measured by ICP atomic emission spectrometry. The resultant data were used to calculate Zn permeability. The Zn permeability was calculated by the expression $(C_2 \times V_2)/(C_1 \times V_1 \times t \times S)$ where $C_1$ represents the Zn concentration (mol/L) of the first aqueous solution before the permeation of Zn, $V_1$ represents the volume (mL) of the first aqueous solution before the permeation of Zn, $C_2$ represents the Zn concentration (mol/L) of the second aqueous solution after the permeation of Zn, $V_2$ represents the volume (mL) of the second aqueous solution after the permeation of Zn, t represents the permeation time (min) of Zn, and S represents the area (cm$^2$) of the membrane through which Zn permeates. The results are shown in Table 1 and FIG. 20.

TABLE 1

| | | Determination of He permeability | | | | Determination of Zn permeability | | | | |
|---|---|---|---|---|---|---|---|---|---|---|
| | Sample Area of membrane | Differential pressure | Amount of permeated He | He permeability | Time | Zn concentration of first aqueous solution before permeation of Zn | Volume of first aqueous solution before permeation of Zn | Zn concentration of second aqueous solution after permeation of Zn | Volume of second aqueous solution after permeation of Zn | Zn permeability |
| Sample No. | S cm$^2$ | P atm | F cm$^3$/min | cm/min · atm | t h | $C_1$ mol/L | $V_1$ mL | $C_2$ mol/L | $V_2$ mL | m$^{-2}$ · h$^{-1}$ |
| 1 | 1.52 | 0.16 | 0.03 | 0.1 | 24 | 0.35 | 6.5 | 0.00029 | 6.2 | 0.22 |
| 2 | 0.07 | 0.94 | 0.05 | 0.8 | 168 | 0.44 | 6.5 | 0.00041 | 4.6 | 0.58 |
| 3 | 1.77 | 0.16 | 0.17 | 0.6 | 24 | 0.35 | 6.8 | 0.0031 | 6.8 | 2.1 |
| 4 | 1.88 | 0.15 | 0.40 | 1.4 | 22 | 0.35 | 7.3 | 0.0046 | 7.3 | 3.2 |
| 5 | 1.57 | 0.16 | 0.77 | 3.1 | 22 | 0.43 | 6.9 | 0.0046 | 6.9 | 3.1 |
| 6 | 1.45 | 0.16 | 2.32 | 10 | 22 | 0.43 | 6.8 | 0.0046 | 6.9 | 3.4 |
| 7 | 1.63 | 0.15 | 4.08 | 17 | 24 | 0.35 | 7.2 | 0.047 | 5.0 | 24 |
| 8 | 1.71 | 0.17 | 12.2 | 42 | 23 | 0.42 | 7.0 | 0.076 | 5.2 | 34 |
| 9 | 1.86 | 0.16 | 26.5 | 89 | 23 | 0.42 | 7.3 | 0.070 | 6.9 | 37 |
| 10 | 1.95 | 0.17 | 84.6 | 260 | 26 | 0.42 | 6.8 | 0.090 | 6.5 | 40 |

What is claimed is:

1. A separator structure for use in a zinc secondary battery, the separator structure comprising:
    a ceramic separator comprising an inorganic solid electrolyte and having hydroxide ion conductivity and water impermeability; and
    a peripheral member disposed along the periphery of the ceramic separator and comprising at least one of a resin frame and a resin film,
    wherein the separator structure exhibits water impermeability as a whole, and
    wherein the ceramic separator has a He permeability per unit area of 10 cm/min·atm or less.

2. The separator structure according to claim 1, wherein the peripheral member comprises a resin frame, and the ceramic separator is fitted or bonded inside the frame and/or on the frame.

3. The separator structure according to claim 1, wherein the peripheral member comprises a resin film having an opening, and the ceramic separator is fitted or bonded to the opening of the resin film.

4. The separator structure according to claim 1, wherein the peripheral member comprises a combination of a resin frame and a resin film having an opening, the ceramic separator is fitted or bonded inside the frame and/or on the frame, and the frame is fitted or bonded to the opening of the resin film.

5. The separator structure according to claim 1, wherein the peripheral member comprises the frame, and the frame comprises at least one species selected from the group consisting of polyolefin resins, ABS resins, polypropylene resins, polyethylene resins, and modified polyphenylene ethers.

6. The separator structure according to claim 1, wherein the peripheral member comprises the resin film, and the resin film comprises at least one species selected from the group consisting of polypropylene resins, polyethylene resins, poly(ethylene terephthalate) resins, poly(vinyl chloride) resins, and modified polyphenylene ethers.

7. The separator structure according to claim 1, wherein the peripheral member is bonded to the ceramic separator with an adhesive.

8. The separator structure according to claim 4, wherein the frame is bonded to the resin film by thermal fusion or with an adhesive.

9. The separator structure according to claim 1, further comprising at least one porous substrate on either or both of the surfaces of the ceramic separator, wherein the inorganic solid electrolyte is in a membrane or layer form and is disposed on or in the porous substrate.

10. The separator structure according to claim 9, wherein the layered double hydroxide comprises an aggregation of platy particles, and the platy particles are oriented such that the tabular faces of the particles are substantially perpendicular to or oblique to a surface of the porous substrate.

11. The separator structure according to claim 1, wherein the ceramic separator has a Zn permeability per unit area of $10\ m^{-2}\cdot h^{-1}$ or less as determined by the contact of the separator with water.

12. The separator structure according to claim 1, wherein the zinc secondary battery is a nickel-zinc battery or a zinc-air battery.

13. The separator structure according to claim 1, wherein the inorganic solid electrolyte comprises a layered double hydroxide.

14. The separator structure according to claim 13, wherein the layered double hydroxide has a fundamental composition represented by the following general formula:

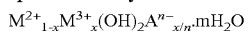

where $M^{2+}$ represents a divalent cation, $M^{3+}$ represents a trivalent cation, $A^{n-}$ represents an n-valent anion, n is an integer of 1 or more, x is 0.1 to 0.4, and m is 0 or more.

* * * * *